United States Patent [19]

Gooch

[11] 4,325,085

[45] Apr. 13, 1982

[54] METHOD AND APPARATUS FOR ADAPTIVE FACSIMILE COMPRESSION USING A TWO DIMENSIONAL MAXIMUM LIKELIHOOD PREDICTOR

[75] Inventor: Robert P. Gooch, Gaithersburg, Md.

[73] Assignee: Digital Communications Corporation, Germantown, Md.

[21] Appl. No.: 157,609

[22] Filed: Jun. 9, 1980

[51] Int. Cl.³ .............................................. H04N 1/40
[52] U.S. Cl. ............................ 358/261; 340/347 DD; 358/260; 364/515
[58] Field of Search ............... 358/260, 261, 280, 133; 340/347 DD; 364/515

[56] References Cited

U.S. PATENT DOCUMENTS

| | | | |
|---|---|---|---|
| 4,097,903 | 6/1978 | Nakagome | 358/261 |
| 4,144,547 | 3/1979 | Stoffel | 358/260 |
| 4,161,757 | 7/1979 | Spencer | 358/261 |
| 4,163,260 | 7/1979 | Hisao | 340/347 DD |
| 4,167,758 | 9/1979 | Rothgordt | 358/261 |
| 4,168,513 | 9/1979 | Hains | 340/347 DD |
| 4,173,771 | 11/1979 | Iijima | 358/260 |
| 4,213,154 | 7/1980 | Ono | 358/260 |
| 4,215,375 | 7/1980 | Usubuchi | 358/261 |
| 4,223,356 | 9/1980 | Renelt | 358/261 |
| 4,229,768 | 10/1980 | Kurahayashi | 358/261 |
| 4,233,601 | 11/1980 | Hankins | 340/703 |
| 4,259,693 | 3/1981 | Aaron | 358/261 |

*Primary Examiner*—Howard Britton
*Attorney, Agent, or Firm*—Pollock, Vande Sande & Priddy

[57] ABSTRACT

Data compression, for either a storage or transmission, of facsimile information is effected employing a two dimensional, non-contiguous prediction matrix. A data stream representing the data to be compressed is input to a buffer which is of a size to store sufficient information for prediction purposes. A predictor is responsive to the buffer for producing a predicted data representation from a plurality of data units comprising a two dimensional matrix. A selector is responsive to the data unit employed in the prediction process for making a select/non-select determination. For those data units which are selected, a comparator compares the predicted status of the data unit with the actual status of the data unit. At least one run length encoder is responsive to the comparator for run length encoding successive correct predictions and a following incorrect prediction. An output buffer is provided for storing the run length encoded output of the run length encoder as well as representations of the non-selected data units. By using plural run length encoders, each can be optimized for the encoded data by correlating prediction difficulty with code length, i.e., easy predictions are encoded by long code words and hard predictions are encoded with short words. Further, the unselected class data units correspond to most difficult predictions and these are not coded.

25 Claims, 32 Drawing Figures

N=8

| | $X_7$ | | $X_8$ |
|---|---|---|---|
| $X_6$ | $X_3$ | $X_2$ | $X_4$ |
| $X_5$ | $X_1$ | $X_0$ | |

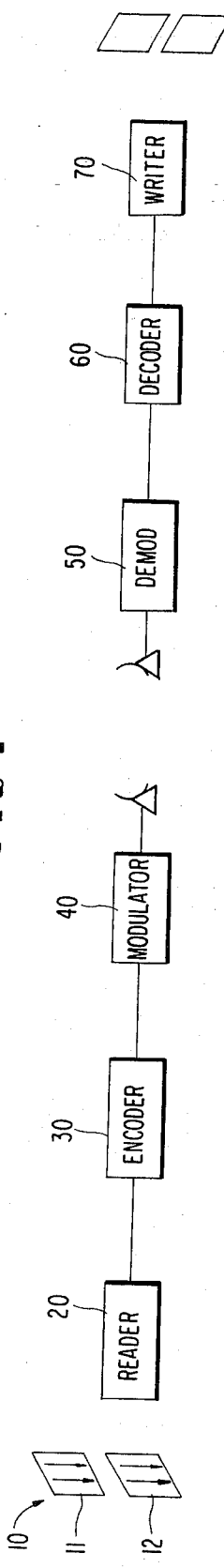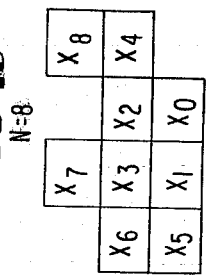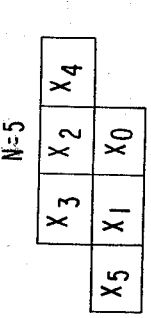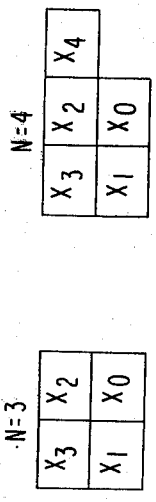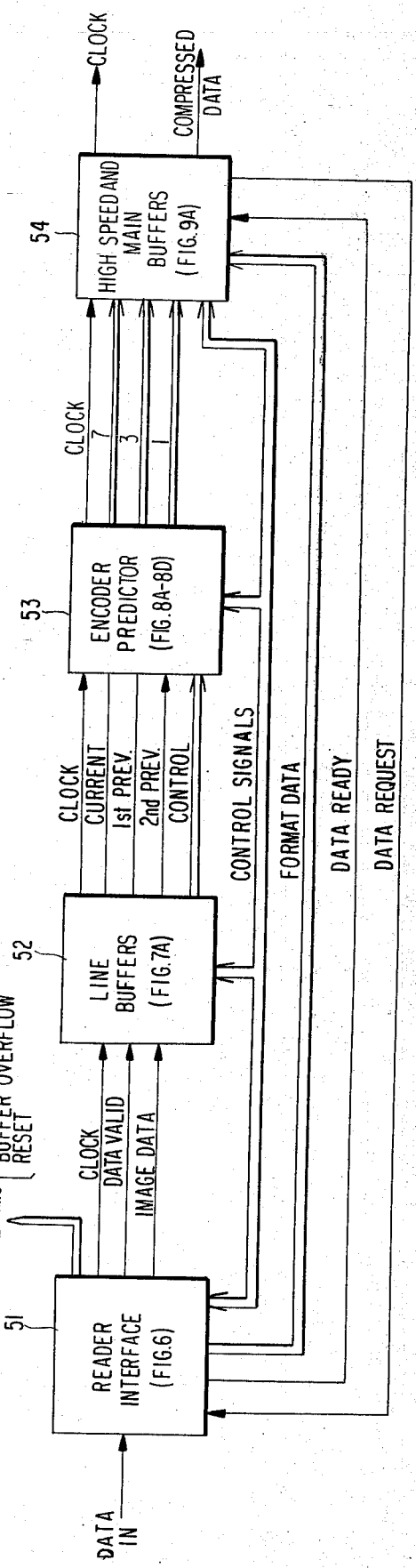

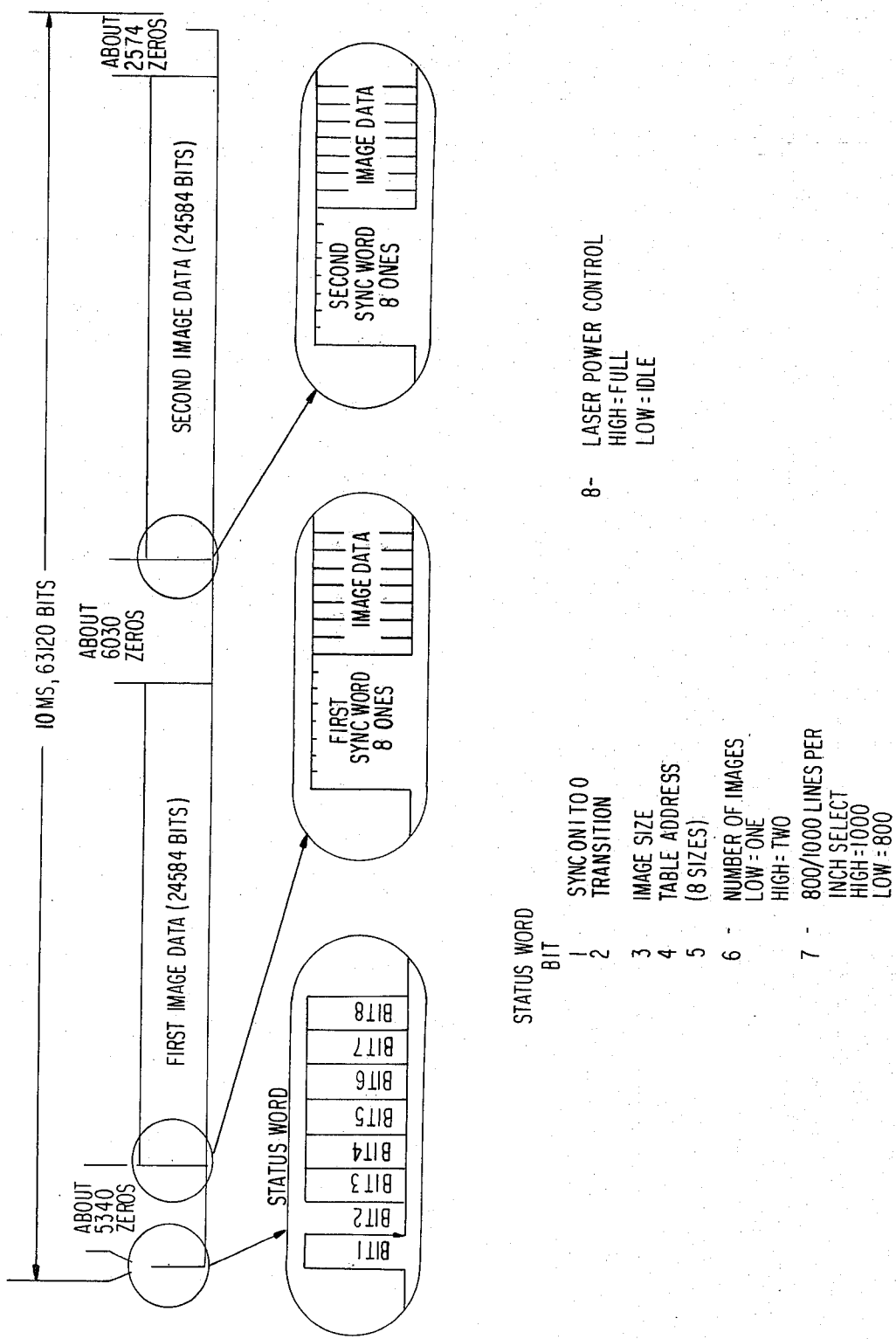

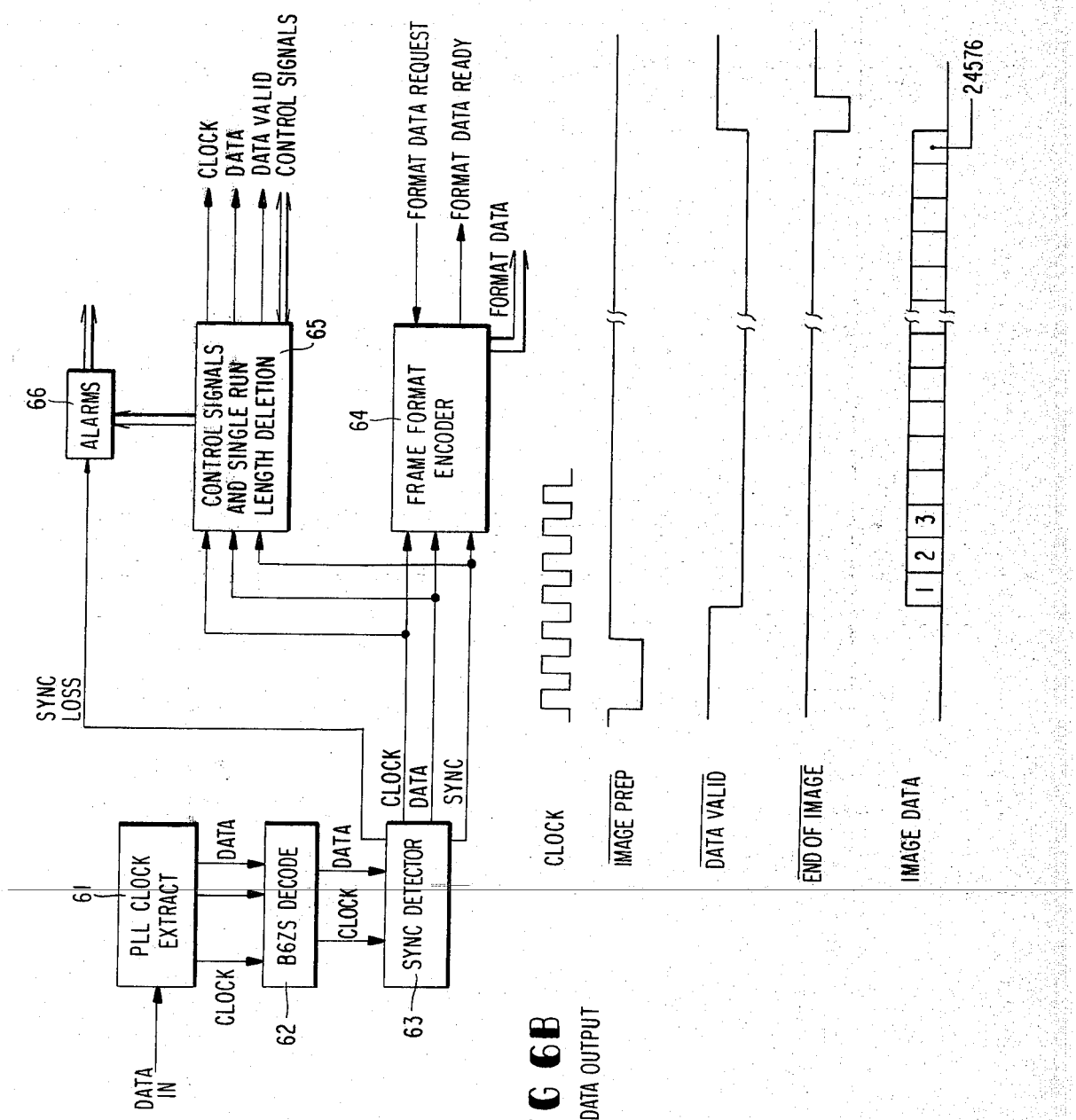

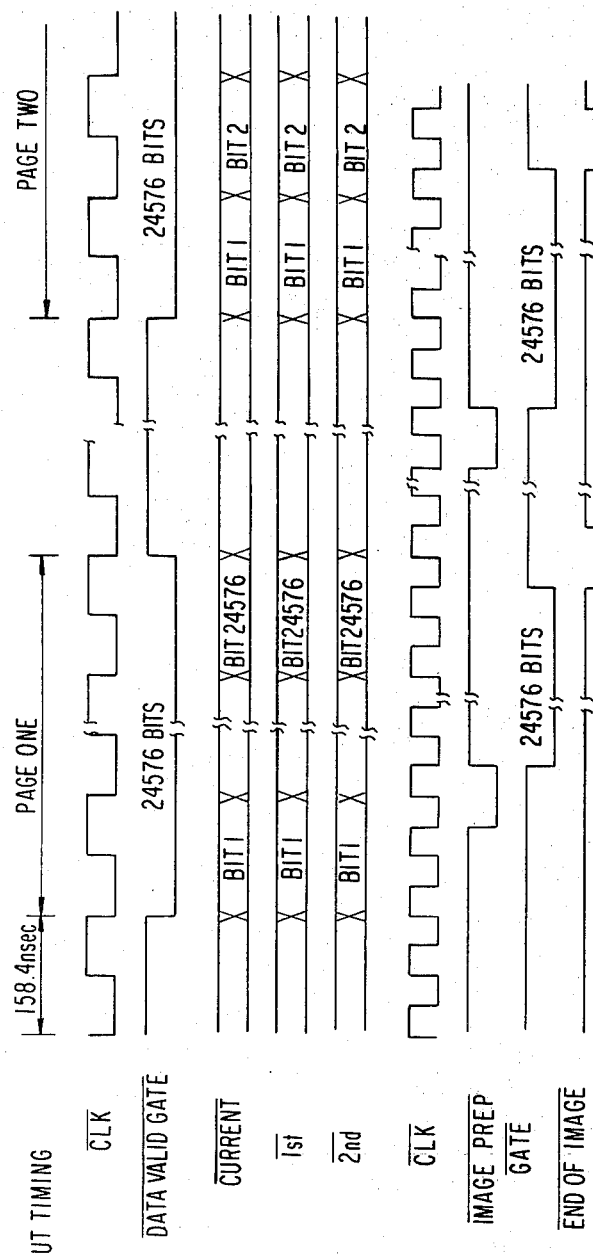
FIG 8E — PREDICTOR-ENCODER INPUT TIMING
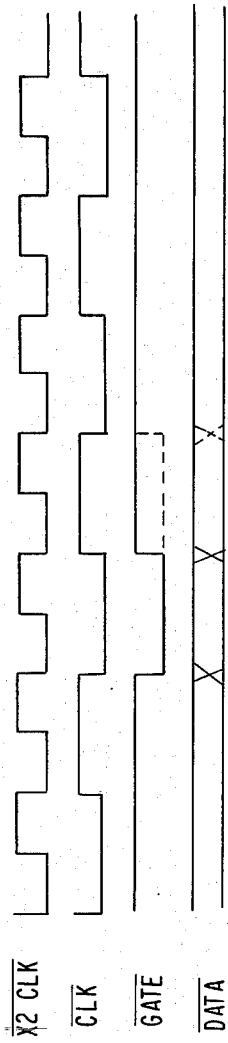
FIG 8F — PREDICTOR-ENCODER OUTPUT TIMING

ENCODER BUFFER UNIT

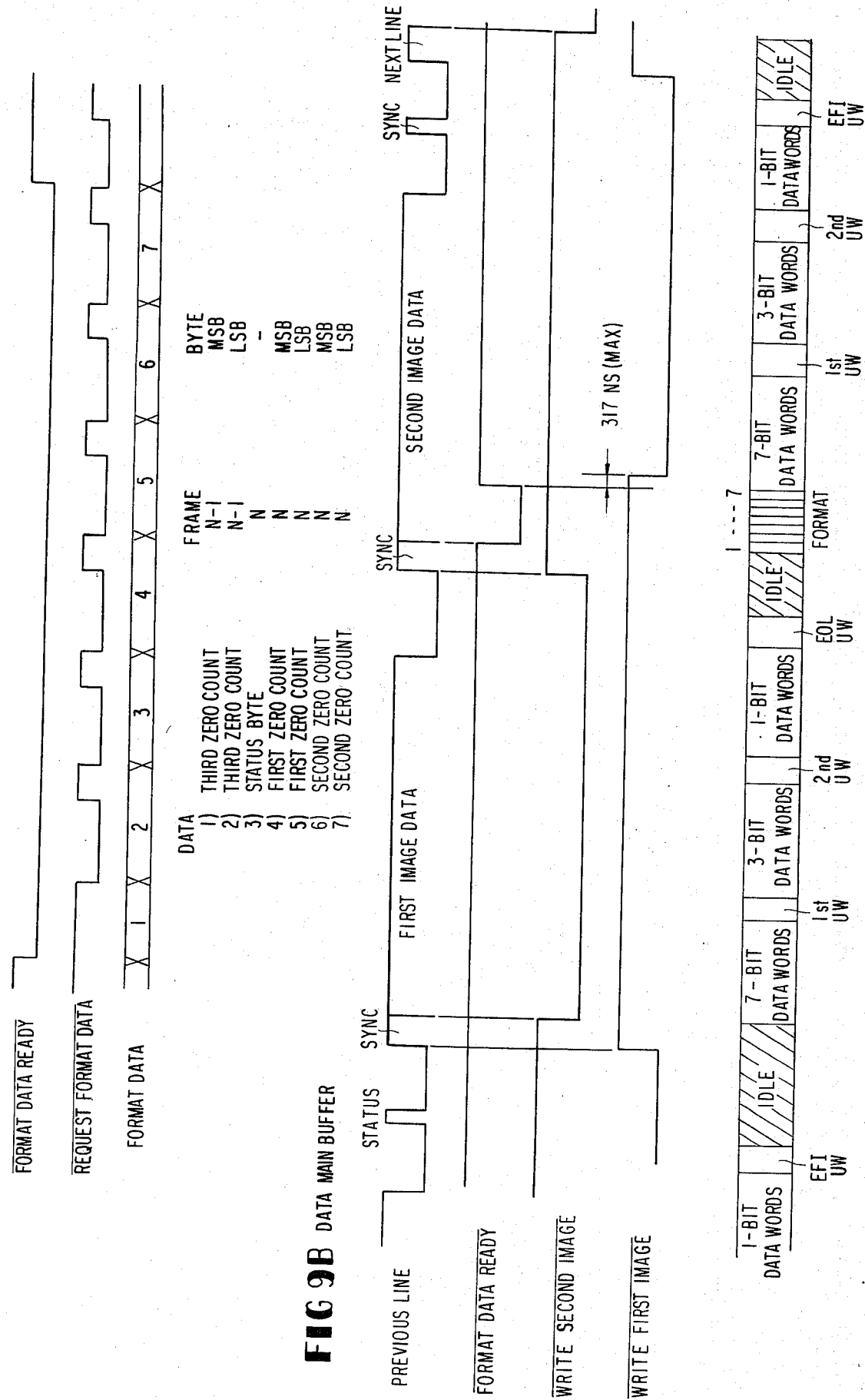

HSB DATA TRANSFER

CONTROL UNIT OPERATION

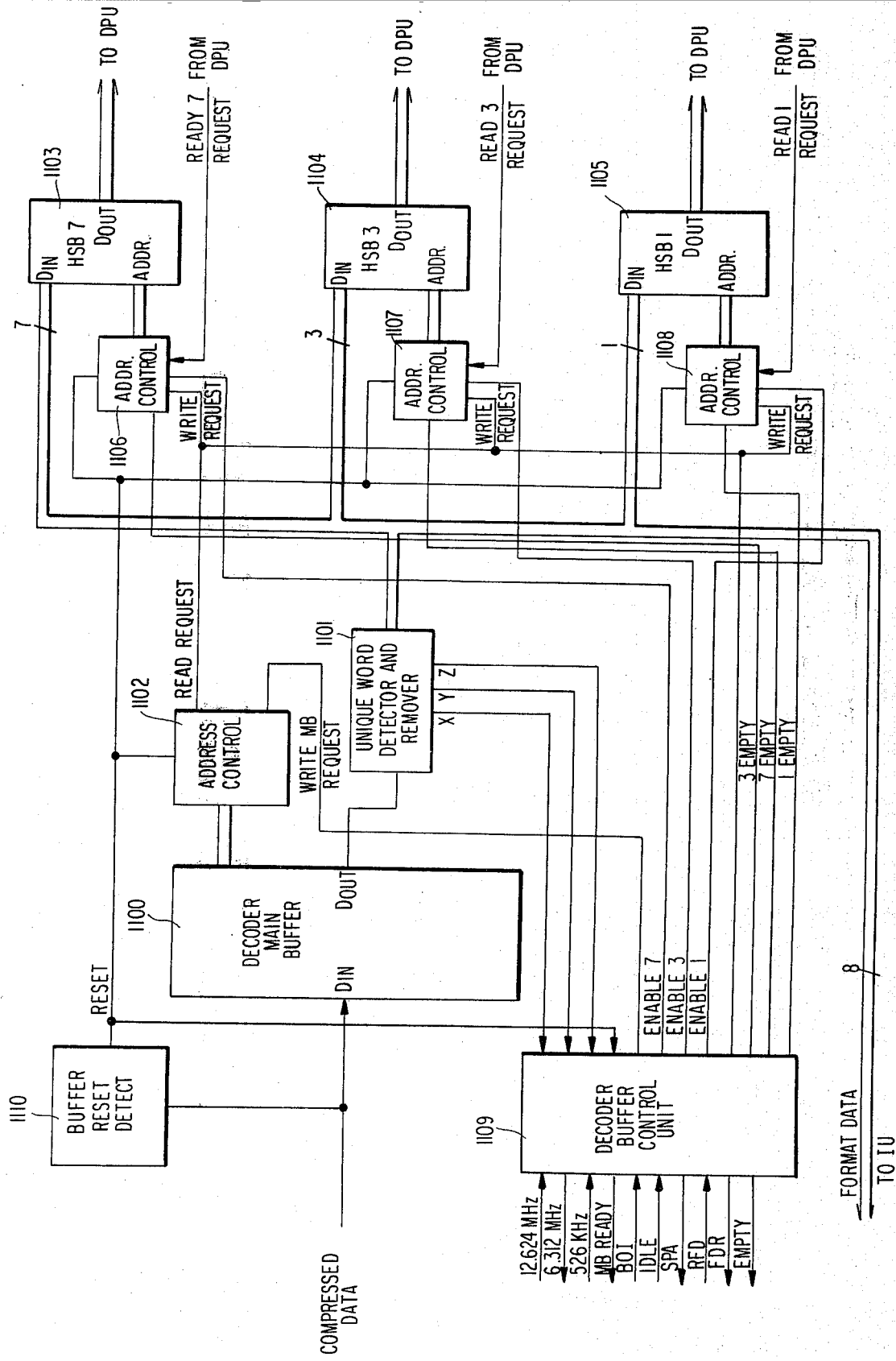
FIG 11A  DECODER BUFFER UNIT

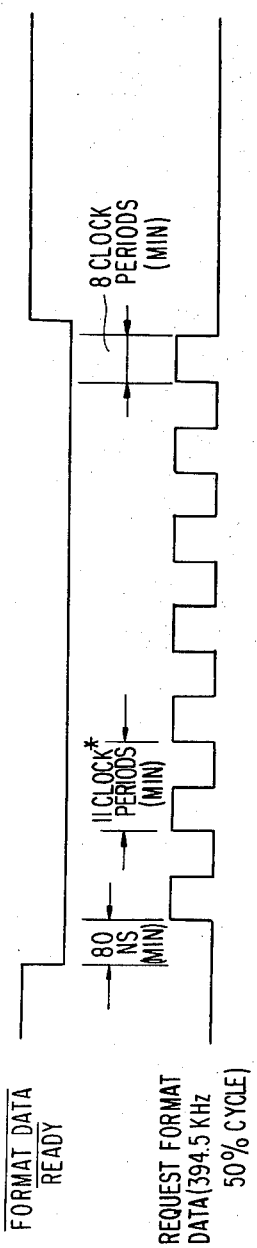
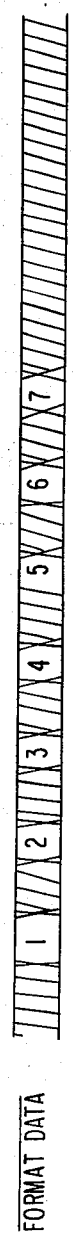
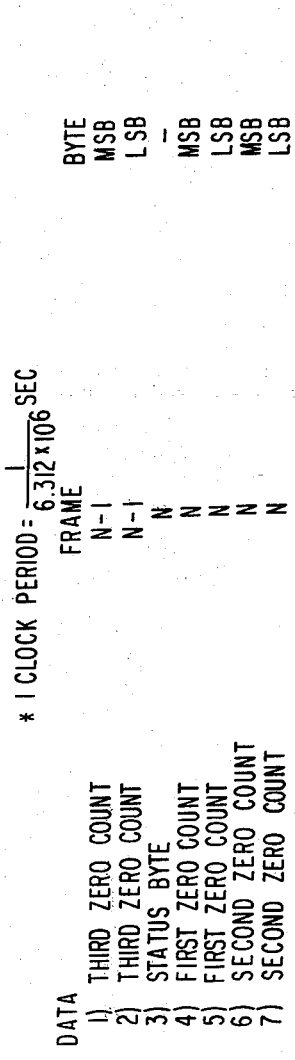
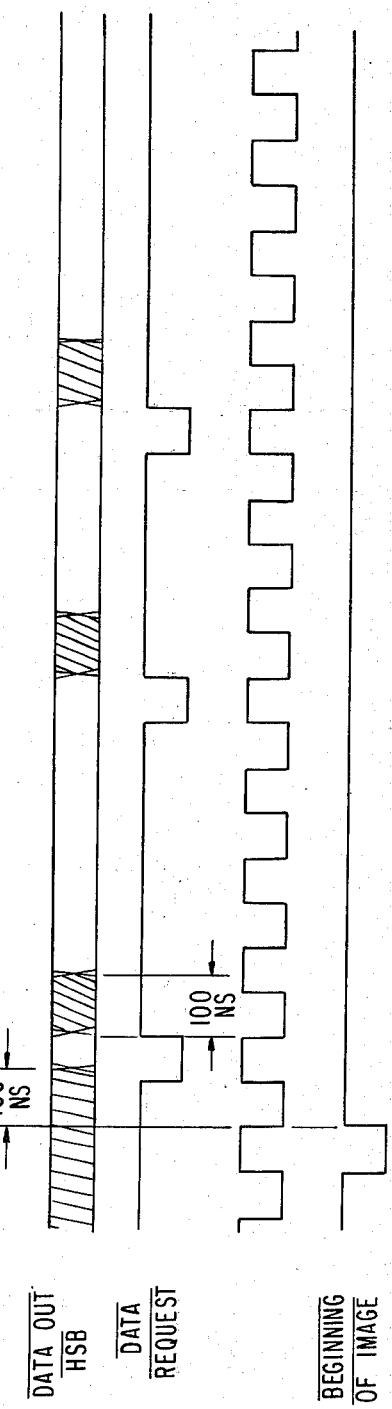
FIG. 11B
FORMAT DATA TRANSFER
FIG. 11D
HSB DATA REQUEST TRANSFERS

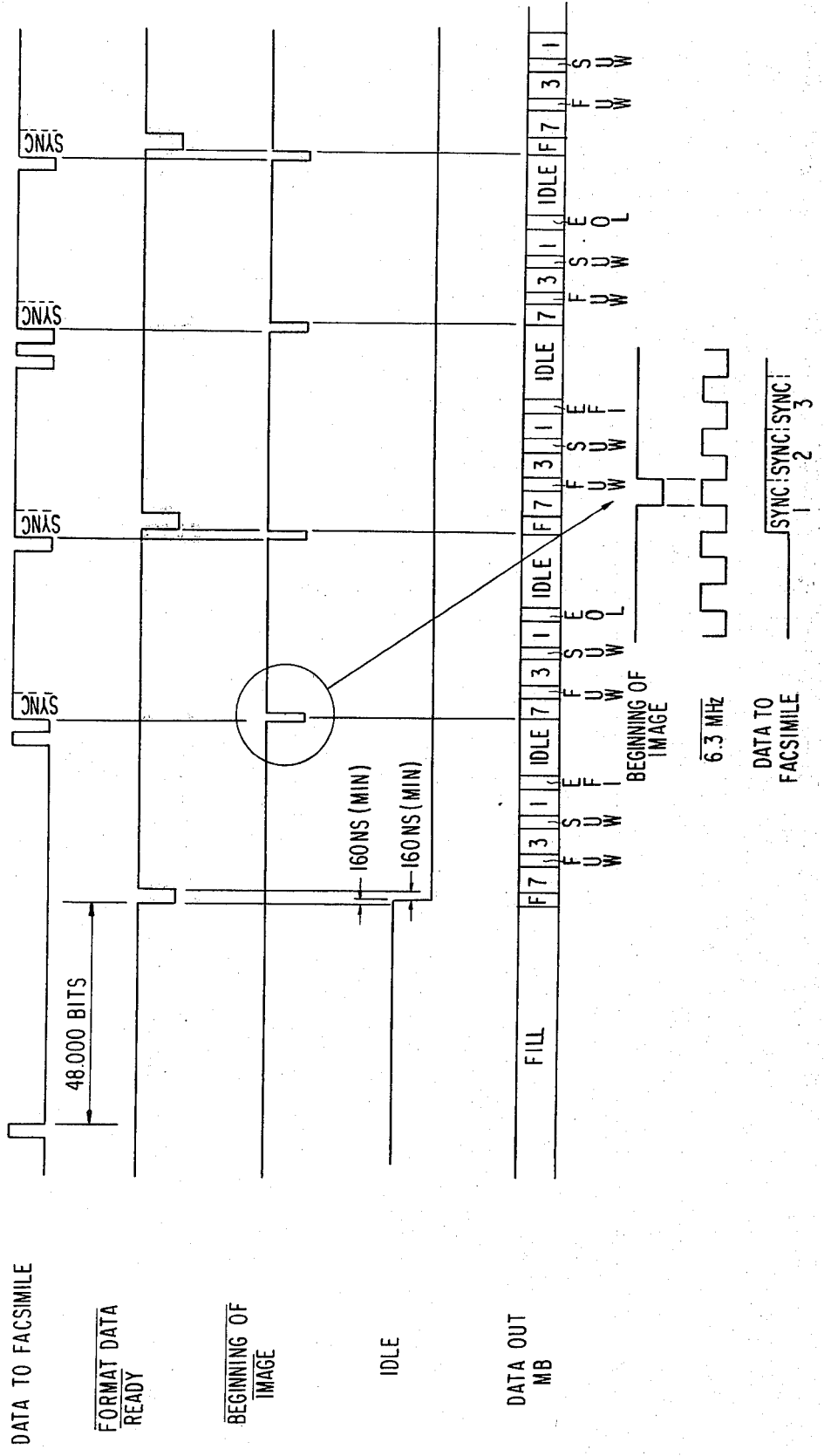

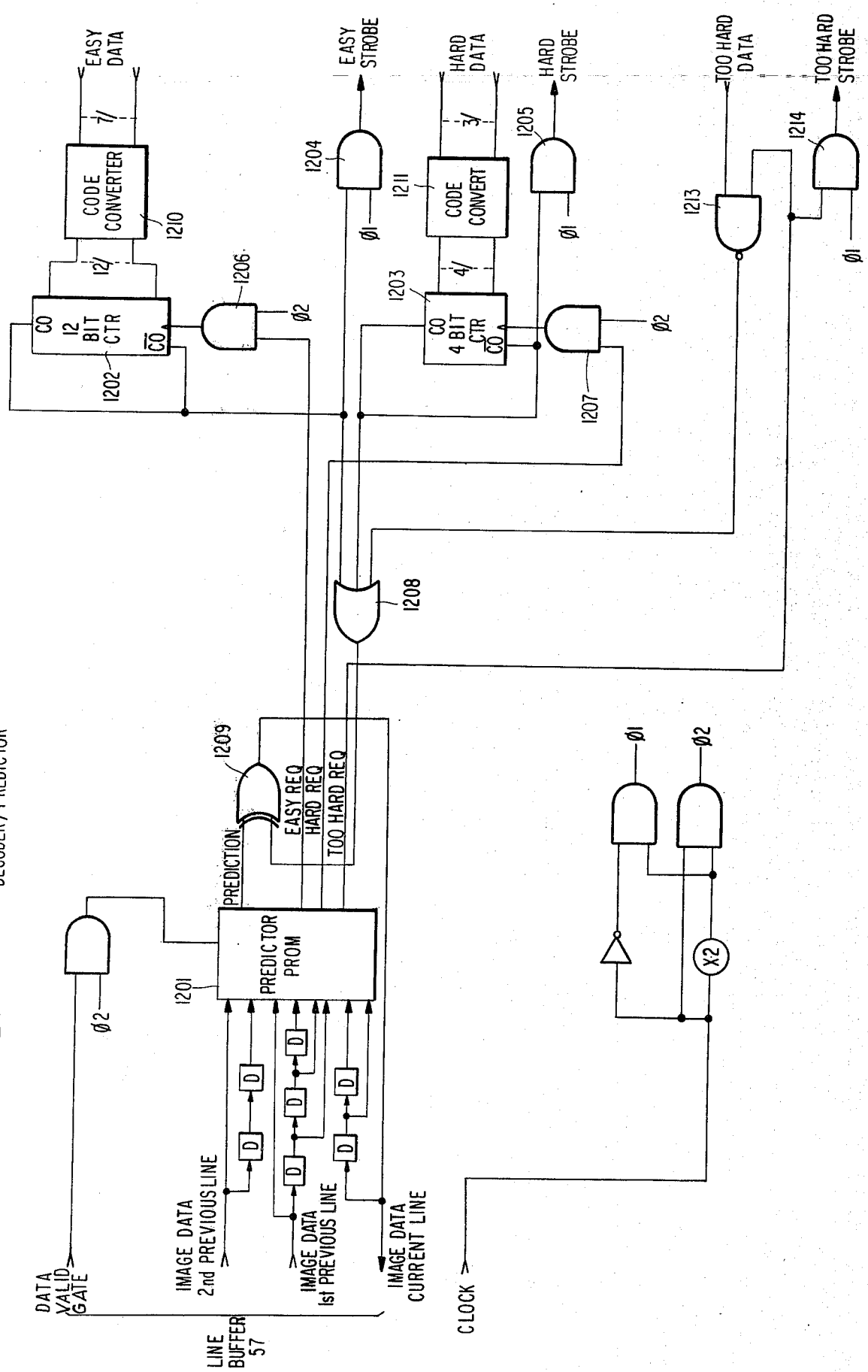

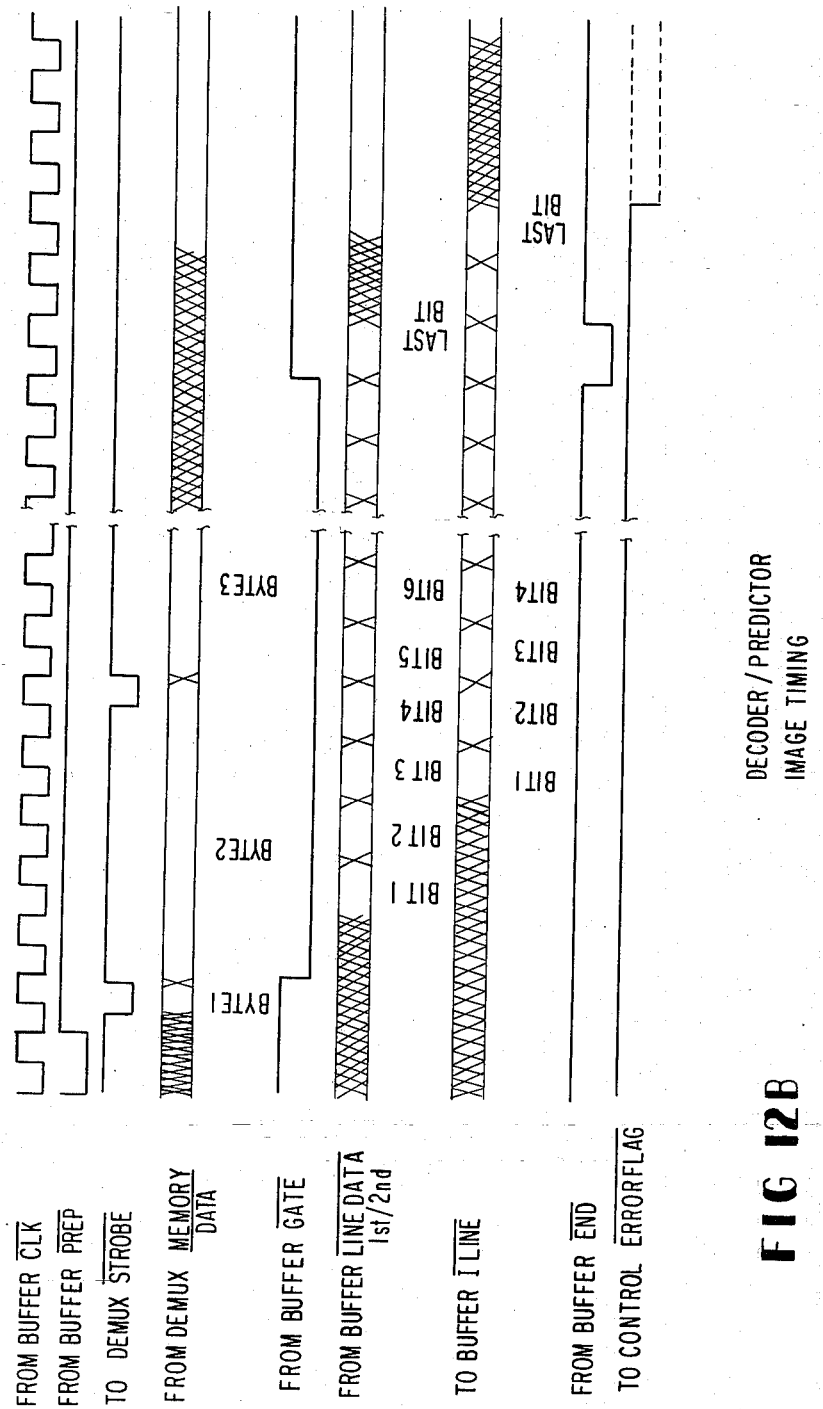
FIG 12B  DECODER/PREDICTOR IMAGE TIMING

METHOD AND APPARATUS FOR ADAPTIVE FACSIMILE COMPRESSION USING A TWO DIMENSIONAL MAXIMUM LIKELIHOOD PREDICTOR

FIELD OF THE INVENTION

The invention comprises a method and apparatus for data compression which is particularly useful in facsimile transmission of text or graphic data.

BACKGROUND OF THE INVENTION

There are many applications in which text or graphic data is digitally encoded, for either storage or transmission purposes. It has long been recognized that regardless of whether or not the data to be transmitted or stored is graphical or textual, economies can be obtained by compressing the data, usually without significant loss of information. One particular example which shall be described in detail in the following portion of this application, is the digital transmission of an image of a newspaper page.

The prior art is replete with source encoding techniques for compressing, see for example, "Optimum Run Length Codes" by Meyr et al in *IEEE Transactions on Communications*, Volume COM-22, No. 6, June 1974, page 826 et seq; "Two Dimensional Facsimile Source Encoding Based on a Markov Model" by Preuss in NTZ 28 (1975) H. 10, S. 358–363; "Comparison of Redundancy Reducing Codes for Facsimile Transmission of Documents" by Musmann et al, *IEEE Transactions on Communications*, Volume COM-25, No. 11, November, 1977, page 425 et seq; "Coding of Two-Tone Images" by Huang, *IEEE Transactions on Communications*, Volume COM-25, No. 11, November, 1977, page 1406 et seq; U.S. Pat. No. 4,163,260; U.S. Pat. No. 4,167,758; U.S. Pat. No. 4,144,547, and "Adaptation of Ordering Techniques for Facsimile Pictures With No Single Element Runs" by Natravali et al appearing in *BSTJ*, Volume 58, No. 4, April, 1979, pages 857 et seq. Additional suggestions and techniques are found in "Survey of Adaptive Image Coding Techniques by Habibi, *IEEE Transactions on Communications*, Volume COM-25, No. 11, November, 1977, page 1275 et seq. "Potential Digitalization/Compression Techniques for Shuttle Video" by Habibi et al appearing in *IEEE Transactions on Communications*, Volume COM-26, No. 11, November 1978, pages 1671 et seq; "A Survey of Digital Picture Coding" by Habibi et al, *Computer*, May 1974, pages 22 et seq; "Hybrid Coding of Pictorial Data" by Habibi, *IEEE Transactions on Communications*, May 1974, pages 240 et seq; U.S. Pat. No. 4,173,771; U.S. Pat. No. 4,168,513; U.S. Pat. No. 4,161,757 and U.S. Defensive Publication No. T-985,005.

The digital transmission of an image (whether it be textual or graphic, or a combination) requires that the image be digitized, so that the digital samples of the image can be switched, stored or transmitted. The digitizing process can produce pixels (picture elements) which can be described as a single bit, or a plurality of bits (for example when brightness of the image is to be retained). Regardless of the number of bits required to represent each pixel, image compression is based upon the thesis that most images are correlated i.e., there is some amount of redundancy in the image, and by eliminating the redundancy, the total number of bits required to represent the image can be reduced i.e., compressed.

As is apparent from the prior art cited above, the difficulty with this approach is that, to the extent that mathematical operators are available which are capable of eliminating all or most of the redundancy from a particular bit pattern, they are prohibitively costly to implement because of the extensive computations required. On the other hand, those relatively simple mathematical processes which are simple to implement, and which are capable of eliminating some redundancy in particular bit patterns, are not sufficiently optimized over a population of bit patterns that they can usefully be employed in most real world applications, for example, that of transmitting an image of a newspaper page. To overcome this, the prior art has arranged various types of "adaptive" mechanisms in which the processes employed adapt to the particular bit patterns being subjected to compression. The present invention is an improvement in adaptive compression techniques.

In one particular application, newspaper images, each 22 by 14 inches (or $22'' \times 14''$) are scanned at a thousand lines per inch, producing approximately $308 \times 10^6$ pixels per page. Transmission of that data at approximately 6 Megabits per second enables the transmission of one page per minute. While those parameters are well within the skill of the art, economies can be effected by compressing the data required to describe the image, and a goal originally required was at least a 10:1 compression ratio as an overall average.

SUMMARY OF THE INVENTION

The present invention provides for an adaptive image coder capable of transmitting, without degradation, images of a newspaper page, which had previously been represented by approximately $300 \times 10^6$ one bit pixels, by an average compression of 10:1 jointly employing the techniques of predictive and run length encoding.

Initially, the pixels representing the image are subjected to predictive encoding using an eight bit non-contiguous pattern, and dividing the 256 possible states of the eight bit pattern into three classes, a first class with a relatively low entropy, a second class with higher entropy, and a third class with still higher entropy. The successful/unsuccessful prediction outcomes for the first class of states are run length encoded using a run length code optimized for relatively long runs. The second class of prediction outcomes is also run length encoded, but using a different run length code, optimized for shorter runs. Finally, the last class of states is not encoded, rather those pixels are sent in raw form.

The combination of the image being compressed (a newspaper page) and the resolution employed (about 1000 lines per inch) enable further compression economies to be achieved by eliminating single pixel runs. At normal viewing distances (say six inches) and with 1000 lines per inch resolution, single pixel runs are invisible to the naked eye and therefore eliminating those runs does not result in loss of information. Accordingly, predictive encoding as outlined in the preceding paragraph takes place on digitized image data which has been subjected to elimination of single pixel runs.

One inherent difficulty with image compression techniques is the multiplication, when the image is recreated, of the deleterious effects of transmission or storage errors. To reduce the effect of such errors, as the image is recreated, it is checked to ensure that the correct number of pixels exist per line, and if an error is found, the decoded line is eliminated, and instead a previously decoded line is employed. To limit the propagation of errors, the recreating mechanism is reset after a fixed, but relatively large number (e.g. 20-40) of lines have been recreated.

A further problem to be addressed in employing image compression, especially when the compression is achieved for transmission purposes, is the variable rate at which data is transmitted. The transmitted data rate is variable since, even in those cases in which a fixed average compression is achieved, that average compression is made up of time varying "instantaneous" compression ratios. Two trivial solutions to the problem are; firstly, to provide a transmission link capable of transmitting at the highest possible rate, i.e., uncompressed, or secondly to simply throw away data which exceeds the available transmission rate. In the first case, the advantages obtained by compression are eliminated if a data link is employed which is fast enough to transmit uncompressed data. The second case obviously results in a degraded image.

In accordance with the present invention, each image transmitted is made up of a pair of sub-images (each sub-image corresponding to a separate page). The image is scanned linearly, and the prediction and encoding processes result in a plurality of lines of data, each of which is made up of pixels from both sub-images. To some extent "the instantaneous" data rate of the predicted and encoded data is "smoothed" by input and output buffers. To the extent however, that buffering action is inadequate to reduce the "instantaneous" data rate to within the capacity of the system, then portions of one or more encoded data lines are discarded. However, the portions so discarded are all derived from one of the two sub-images. As a result, even if some data is discarded, successful transmission of one of the sub-images is assured. The unsuccessful sub-image is then transmitted at a later time.

Finally, another feature of the invention is the use of a non-contiguous prediction pattern. The specific pattern selected for use is an 8 pixel pattern which of course extends in two dimensions and thus is comprised of plural lines of "pixels". However, at least one of the lines is unfilled in that pixels in the pattern surround one or more pixels in the same line which are not in the pattern.

Thus, in accordance with the invention, a bandwidth compression device for information scanned in two dimensions and represented by a serial stream of pixel representations comprises:

(a) first buffer means for storing at least some of said pixel representations, sufficient to represent a portion of said information extending in both said dimensions, (b) predictor means coupled to said buffer means for generating, from at least three pixel representations, predicted pixel representations for a further pixel, said pixels forming a pixel set extending in both said dimensions, (c) selection means responsive to said at least three pixel representations for selecting or not selecting, said further pixel for encoding, (d) comparing means for comparing said predicted representation of a selected pixel with an actual representation of said pixel from said buffer means, to determine if said prediction is or is not correct, (e) run length encoding means responsive to said comparing means for encoding successive correct predictions and a following incorrect prediction as a multibit word, and second buffer means responsive to said run length encoding means and said prediction means for storing said multibit word and at least one unencoded pixel representation corresponding to an unselected pixel.

In accordance with another aspect of the invention a method is provided of compressing a serial digital data stream representing pixels of an image scanned in two dimensions, at a resolution sufficient to negate the importance of single pixel runs, comprising the steps of:

operating on said serial data stream to eliminate all single pixel runs to thereby produce a modified data stream, selecting, from said modified data stream a plurality of pixels forming a set of pixels representing an image portion extending in two dimensions, from which to predict the condition of the last remaining pixel in said set, predicting from said plurality of pixels the condition of said remaining pixel and determining whether or not run length encoding is appropriate for said predicted pixel, comparing said predicted pixel with said actual pixel and run length encoding correct/incorrect predictions, filling a buffer with a sequence of run length codes representing run length encoding of said correct/incorrect predictions and following said codes with one or more signals representing pixels for which run length encoding was determined to be inappropriate.

BRIEF DESCRIPTION OF THE DRAWINGS

The invention will now be described in such detail as to enable those skilled in the art to make and use the same, in the following portions of this specification taken in conjunction with the attached drawings in which like reference characters identify identical apparatus and in which:

FIG. 1 is a block diagram of a facsimile transmission system for which the invention is appropriate:

FIG. 2 shows the format of the output from the reader of FIG. 1:

FIG. 3 is an illustration useful in explaining run length encoding;

FIGS. 4A, 4B, 4C and 4D are two-dimensional pixel sets used in different types of prediction encoding;

FIG. 5 is a block diagram of an encoder in accordance with the invention;

FIG. 6A is a detailed block diagram of reader interface 51 of FIG. 5;

FIG. 6B illustrates representative waveform in the apparatus of FIG. 6A;

FIGS. 8E and 8F illustrate representative waveforms of the predictor 53;

FIGS. 9B, 9C and 9D illustrate waveforms of FIG. 9A;

FIG. 11A is a detailed block diagram of high speed and main buffer 55 of FIG. 10;

FIGS. 11B, 11C and 11D represent waveforms of FIG. 11A;

FIG. 12A is a detailed block diagram of decoder/predictor 56 of FIG. 10; and

FIG. 12B illustrates decoder predictor representative waveforms.

DETAILED DESCRIPTION OF THE INVENTION

Figure 7A:
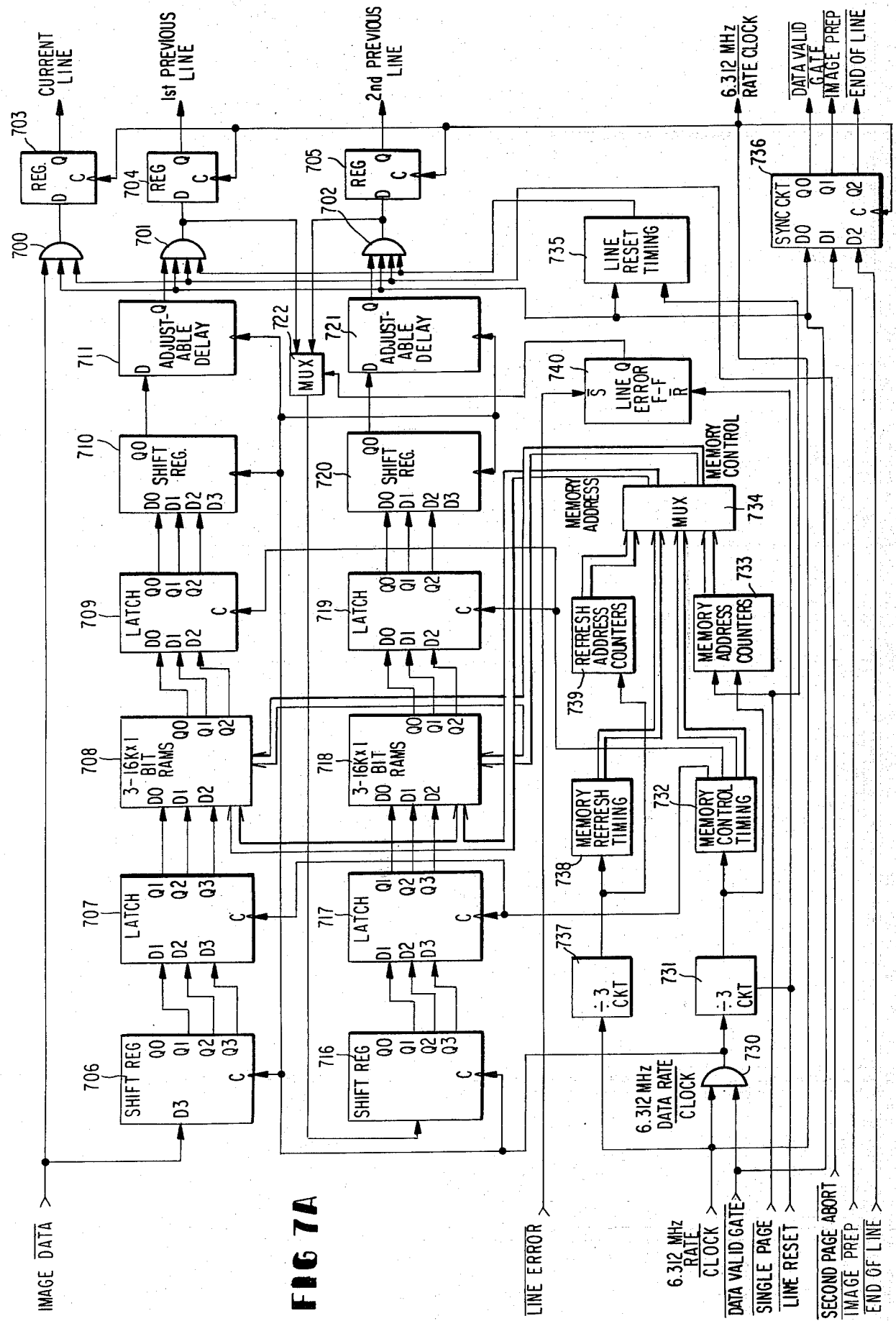
FIG. 7A is a detailed block diagram of the line buffer 52 of FIG. 5.

Before providing a detailed description of the invention reference is made to FIG. 1 to illustrate the context in which the invention finds utility and to discuss some typical parameters of the manner in which the invention may be applied.

FIG. 1 illustrates an arrangement for reading data from an image 10, and allowing a copy of that image 10 to be produced at a geographically separated location. Thus, the image 10 is scanned by a reader 20. When the image to be transmitted is readily visible the reader 20 may rely upon optical scanning techniques, that is, a beam of light is scanned across the image, as shown in FIG. 1, for example, from top to bottom, each scan producing a "line" of information corresponding to the image, and by relatively translating the reader and image, a plurality of such "lines" are produced representing in toto the entire image. The reader converts the optical signals into digital data signals by, for example, quantizing the reflected light. In many applications the quantization of the reflected light into two different catagories is sufficient and therefore, a single binary bit is produced each time the reflected image is sampled. This bit is sometimes referred to as a pixel. By reason of the scanning and quantizing process each pixel can be related to an area on the image and can be said to represent that area.

One prior art technique for reproducing the image at a distant location is to merely feed the pixel representing signals to a modulator, transmit the information in conventional fashion to a demodulator, and after demodulation, drive a writer to reproduce the image 10. It is one of the goals of the present invention to allow this process to proceed by employing a transmission rate between the modulator-demodulator, which is much less than would otherwise have been necessary; in one embodiment by a ratio of 10:1. In terms of a specific application, the reader can consist of a Log E scan Model 2417 laser plate making system. This device employs a mirror on a shaft rotating at approximately 6000 rpm to deflect a laser beam so as to scan the image. Each revolution of the shaft produces one line of data. The reader may output data at approximately 6.3 Megabits per second. This relatively high rate can be reduced to approximately 525 kilobits per second by employing the encoder 30. If, as is preferable, a forward acting error correcting encoder (FEC) is also employed in the encoder 30, then the encoder output is increased to approximately 600 kilobits per second at the input to modulator 40. Thus, the image signal can be transmitted at that rate and demodulated at demodulator 50. The encoder 60 will first, employing a forward acting error correcting decoder, reduce the data rate back to approximately 525 kilobits per second, and then, using the apparatus and method of the invention, convert this back up to approximately a 6.3 magabits per second signal. This relatively high rate signal is applied to the writer 70, to thereby produce a copy of the image originally scanned by the reader 20.

Obviously, FIG. 1 is but an example of the manner in which the invention may be used and should not be taken as limiting. For example, the communication link need not be radio; wire, fiber optic or any other communication link with sufficient bandwidth can be employed. In addition, the communication link may include a scrambler-de-scrambler and further forward acting error correction. In one application an effective error rate of $10^{-9}$ is expected from two stages of rate $\frac{7}{8}$ error encoding.

For reasons which will be explained hereinafter preferably the image 10, which is scanned by the reader actually comprises a pair of sub-images 11 and 12 which are slightly separated. In addition to the pixel representing signals produced by the reader 20, the reader 20 also produces control signals to enable proper control of the writer 70. Since these control signals are not representative of the image, they do not carry the redundancy of that image and therefore, will not be operated upon by the encoder 30 or decoder 60. FIG. 2, illustrates the makeup of one line of output from the reader 20. As is shown the line begins with a status word. Between the status word and the first bit of image data the signal includes a plurality of zeros. One of the functions of this gap is to minimize the registration requirements because of the relatively high resolution (800-1000 lines per inch) of the reader. Immediately preceding the image data is a first synchronization word, the use of which will be explained hereinafter. Following the first synchronization word are a fixed number of bits, each representing a pixel in the line that is scanned to generate the signal. Following the last pixel in this data group is a second string of zeros. At least a portion of these zeros are employed to minimize the relative registration requirements between two sub-images making up the image that is being transmitted. In any event, the second data group is again preceded by a second synchronization word, which is followed by a second string of pixels representing a corresponding line in the second sub-image. Finally, the image concludes with another gap of zeros. As shown in FIG. 2 the entire signal sequence, from beginning of the status word to termination of the third zero's gap is about 10 milliseconds in time and comprises a single line of the image.

PRINCIPLES

Run length encoding is one compression technique which can be used to eliminate the redundancy and thereby compress the quantity of data needed to transmit a particular pattern. In run length encoding, rather than sending a bit for each pixel, representing its state, code words are formed identifying the length of a run. Thus for example, FIG. 3 illustrates 11 pixels, which could be represented at 11100001110, thus requiring 11 bits. However, the same information could be transmitted by generating a code word to represent 3W, 4B, 3W, 1B. Moreover, since pixel states must alternate, it is unnecessary to transmit the state of each pixel run, and thus the same information could be transmitted as 3W, 4, 3, 1. An even further bit reduction can be effected if the image to be transmitted is framed by a background, or margin, falling in one or the other of the states, for example, a white background. Thus, the 11 pixels representation could be transmitted as 3, 4, 3, 1, since we can assume that the initial run will correspond to the border.

In order to optimize run length encoding, we must have some measure of the run length distributions, so that an effective code can be employed to transmit the compressed information. One statistical study made of a data base of images comprising newspaper pages, quantized at 1000 lines per inch resolution showed a run length distribution with peaks at 13 for black runs and 26 for white runs. In addition, few black runs exceeded a length of 90, while substantial numbers of white runs do. In order to estimate the amount of compression available from a particular technique, the entropy of the source must be computed.

The entropy of the source is a measure of the average information content per element of that source, i.e., the limit beyond which compressibility is not possible. Compressibility can be expressed for example in bits per pixel. Entropy can be expressed as $$H = -\sum_{i=1}^{n} P_i \log_2 P_i \text{ bits}$$

where H is the average entropy per symbol, n is the total number of symbols and $P_i$ is the probability of occurrence of a symbol i.

For an image we can calculate the entropy following simple run length encoding expressed in bits per pixel as:

$$H = -\frac{R}{N} \sum_{i=1}^{M} P_i \log_2 P_i$$

where R is a total number of runs,
M is the maximum run length,
N is the total number of pixels,
i = run length,
$P_i$ is the probability of a run of length i.

The maximum compressibility is merely the inverse of the entropy.

For one set of newspaper page images the average entropy per pixel (weighted) was 0.16328 resulting in a maximum compressibility of 6.16 using simple run length encoding. This was inadequate to meet the compressibility goal of at least 10:1.

Run length encoding, however, is only one form of compression encoding. Since it relies only on pixels in the same line as an exemplary pixel, from which to predict the pixel state, it has limited redundancy eliminating capabilities. There are two dimensional codes which rely not only on preceding pixels in the same line, but also adjacent pixels in preceding lines.

If a set of N surrounding pixels are used to predict the value of an exemplary pixel, the number of possible states for the set of N pixels is $2^N$. The probability of occurrence of each one of these states, called the joint probability, is computed by counting the number of occurrences of each state in a sample of images and dividing by the total number of occurrences of all states. Given a particular state (such as all the pixels in the set excluding the exemplary pixel, are white) the probability that the exemplary pixel is also white is called a conditional probability.

Associated with the probabilities is an entropy which can be computed as:

$$H_i = -P_{iw} \log P_{iw} - P_{iB} \log_2 P_{iB}$$

where $H_i$ is the entropy per pixel for state i,
$P_{iw}$ is the conditional probability that the pixel is white, and,
$P_{iB}$ is the conditional probability that the pixel is black.

The total entropy per pixel can be computed as $$H = \sum_{i=1}^{2^N} P_i \cdot H_i$$

where H is the entropy per pixel,
i is the state,
N is the number of surrounding pixels examined,
$P_i$ is the joint probability of state i, and
$H_i$ is the entropy per pixel for state i.

FIGS. 4A, B, C and D illustrate four different sets of pixels which can be employed in a prediction, the sets use respectively 3, 4, 5 and 8 pixels to predict the state of the exemplary pixel $X_0$. For the exemplary images, the maximum compressibility for text has been determined for each of these patterns, the pattern of FIG. 4A achieved compressibility of 13.88:1; the pattern of FIG. 4B achieved compressibility of 17.14:1; the pattern of FIG. 4C achieved compressibility of 17.25:1 and the pattern of FIG. 4D achieved compressibility of 20.13:1.

AN EMBODIMENT

In view of the foregoing, a compression technique starts with a particular prediction pattern, and the particular prediction pattern selected is a trade-off between the desired compressibility and the complexity of implementing the pattern. The compression apparatus then examines the state of each pixel in the pattern and makes a prediction for the state of the exemplary pixel ($X_0$). While this estimate can be arbitrarily determined, preferably it is determined by actual statistical analysis of the types of images sought to be compressed. Once a prediction is effected, the actual state of the pixel is compared with the predicted state. So long as they agree, no data need be sent, since the receiving equipment can, employing the same prediction techniques determine the state of that particular pixel. If a pixel however is found not to agree with the predicted state of the pixel, then some information is necessarily transmitted so the receiver can properly reconstruct the state of the pixel. Run length encoding can be employed to encode the correct/incorrect predictions. In order to optimize the run length encoding, however, some estimate is necessary of the probabilities of correct prediction. For while a single compression technique can be optimized over all samples it can in fact perform in a mediocre manner over each sample. Changing the encoding technique based upon the image statistics allows each code to be optimized over a more consistent set of statistics. Accordingly, in accordance with the inventive method and apparatus, the compression technique used divides each prediction into three different classes. A first class comprises those predictions which are relatively certain, i.e., low entropy per pixel. These can be encoded using relatively long code words since it is expected that few incorrect predictions will occur and thus, the number of times a code word need be transmitted will be minimal. A second class of predictions are, however, relatively more difficult predictions, i.e., a higher entropy per pixel. These predictions are run length encoded using a shorter code word, since it is expected that the length of these runs will be relatively shorter and therefore, more code words need be transmitted. Finally, a last class of predictions are the most difficult to make, i.e., corresponding to the highest entropy per pixel. In this class of predictions no run length coding is provided.

THE ENCODER

FIG. 5 is a block diagram of the encoder in accordance with the present invention.

As shown in FIG. 5 the encoder includes four functional units, a reader interface 51, line buffers 52, an encoder predictor 53, and high speed and main buffer 54.

The reader interface 51 extracts a clock from the incoming data, removes the B6ZS encoding, detects and encodes the incoming frame format and transfers the frame format directly to the buffers 54, detects loss of synchronization and, in response, issues a buffer reset command, deletes all runs of length one, sends data and clock to the line buffers 52 and issues other commands and control signals, as will be specified.

The line buffers 52 buffers two lines of data and delivers to the encoder/predictor 53 three serial data streams, present, first and second previous lines, clears both buffers on a reset command, and clears the second half of each data line after a second page abort command.

The encoder predictor 53 merely passes the clocking signal along to the high speed and main buffer 54, but responds to the "current line" data signals, "first previous line" data signals and "second previous line" data signals by selecting from those signals, signals corresponding to the set of pixels that will be employed for prediction purposes and applies those as addressing inputs to a read only memory (ROM). The "ROM" produces two types of outputs, a predicted pixel value and a control signal indicating status of the particular prediction as easy, more difficult or most difficult. In addition, the predictor compares the predicted pixel value with the actual pixel value and produces as an output an indication of whether or not the prediction is correct.

The encoder predictor 53 employs the control signals and prediction results to encode both the easy and more difficult predictions and merely passes on, unencoded, the most difficult prediction results.

The high speed buffers of the high speed and main buffer 54 stores the run length encoded words and the unencoded data representing the most difficult predictions in separate buffers. This data is shifted out to the main buffer, as required. The The format data, from the interface 51 is multiplexed with data from the high speed buffers and with unique words generated, in the high speed and main buffer 54, in response to control signals from the interface 51. In addition, an appropriate clock which is provided, at an output, along with the contents of the main buffer, read out at a constant rate. Finally, by monitoring the status of the main buffer, overflow and approaching overflow control signals are generated.

Table I illustrates the format of the output from the main buffer 54. As shown in Table I an 8 bit status word, and three 16 bit zero counts precede image data. Following the last zero count an elastic segment, of 7 K bits transmits K 7 bit run length encoded words followed by a 40 bit first unique word.

TABLE I

| Number of Bits | | Type |
|---|---|---|
| 16 | Third Zero Count | Format |
| 8 | Status and Sync Word | Format |
| 16 | First Zero Count | Format |
| 16 | Second Zero Count | Format |
| 7.K | K 7 Bit Words - Easy Runs, First Image | HSB |
| 40 | First Unique Word | Control |
| 3.L | L 3 Bit Words - Hard Runs First Image | HSB |
| 40 | Second Unique Word | Control |
| M | M Bits - Too Hard Runs First Image | HSB |
| 40 | End of First Image Unique Word | Control |
| 40.N | N Fill Unique Words | Control |
| 7.P | P 7 Bit Words - Easy Runs Second Image | HSB |
| 40 | First Unique Word | Control |
| 3.Q | Q 3 Bit Words - Hard Runs, Second Image | HSB |
| 40 | Second Unique Word | Control |
| R | R Bits - Too Hard Runs, Second Image | HSB |
| 40 | End of Line | Control |
| S.40 | Fill Unique Words | Control |

The first unique word separates the elastic 7 K bit segment from a second elastic 3 L bit segment, including L 3 bit words. A second unique word separates the second elastic segment from the third elastic segment which contains M bits, one for each of the unencoded pixels. The three elastic segments are sufficient to define an entire line of one of the two sub-images being transmitted, i.e., a first page. Following the third elastic segment, a further unique word separates this elastic segment from the next elastic segment comprising N 40 bit fill unique words which prevent buffer underflow. The next elastic segment comprising 7 P bits represents the run length encoding for the corresponding line in the second subimage (page) of the "easy" class of predictions. This elastic segment is succeeded by a further unique word and followed by a 3 Q bit segment representing the run length encoded "hard" class of predictions. This elastic segment is followed by a further unique word which itself is succeeded by R bits representing unencoded pixels. The signal stream is completed by an elastic segment comprised of 40 S bits comprising S 40 bit fill unique words and by a fixed 40 bit segment representing an end of line unique word.

As will be explained, in case of impending overflow of the main buffer 54, the second page transmission is aborted and thus the P, Q, and R elastic segments are omitted along with their associated unique words.

The type column indicates the origin of each word, the words of image data (K-R) are derived from the three high speed buffers, whereas the other words are either control or format and derived from the interface 51 or a control unit within buffer 54 which is driven by signals from interface 51.

Each of the unique words is 40 bits long, the first bit of each is a 1, followed by 35 zeros, followed by a further 1. The last three bits enable eight different unique words to be identified: five to separate the various elastic segments, a sixth corresponding to the fill unique word and two different end of line unique words, one to indicate normal line and the second to indicate a second page abort.

In a specific embodiment of the invention which is designed to operate with the Log E reader identified above, the interface 51 (shown in FIG. 6A) is arranged to respond to image data at 6.312 MHz, with frequency stability of $10^{-5}$ encoded in B6ZS format, although it will be apparent to those skilled in the art that the invention can be applied to image data in a wide variety of formats. The clock extraction circuit 61 includes an amplitude limiter, rectifier, and a phase locked loop to recover the clock. The clock extractor 61 passes on to the decoder 62, data sampled at the clock rate and the clock. The decoder 62 is arranged to decode the data and pass clock and unencoded data on to the sync loss detector 63. The input to the sync loss detector is in the form shown in FIG. 2.

The sync loss detector 63 issues a sync pulse in response to the "one-zero" transition in the status word (see FIG. 2). In order to ensure that a sync pulse is not erroneously issued, the sync detector 63 requires at least 16 consecutive zeros prior to the transition. The sync pulse in the embodiment under discussion should occur once per frame, i.e., once per 63,120 bits. If a sync pulse is not issued in this period a sync loss alarm is issued. When the sync pulse is issued it occurs synchronous with bit one of the status word (see FIG. 2).

One of the outputs of the sync loss detector which is coupled to the alarms 66 is the sync loss alarm. The sync loss detector 63 passes to the frame format encoder 64, clock, data and the sync pulse, and the same signals are passed to the data processing and control generation module 65.

The frame format encoder 64 generates three zero counts and passes those zero counts along with the status word to the main buffer in the high speed and main buffer module 54. Each zero count is passed along as a pair of words. One of the three zero counts is the number of clock periods between the last second image data of the previous frame and the sync pulse of the present frame. Another zero count is the number of pulses between the end of the status word (bit 8) and the first bit of the first image sync word. The last zero count is the number of clock periods between the last first image data bit and the first bit of the second image sync word. These seven words, two for each zero count and a single one for the status word, are transferred to the main buffer memory 54 during encoding of the second image data of the frame, and are transferred in response to a request from the main buffer memory 54. Transfer timing for transfer of format data is shown in FIG. 9C. Transfer timing between the control signals and single run deletion module 65 and the line buffer memory is shown in FIG. 6B.

The module 65 transmits the clock and image data received from the sync detector 63. However, the image data transmitted is modified by the module 65 by deleting all runs of length one. The module 65 also generates a data valid signal and image preparation signal and an end of image signal. Following each sync pulse, detection of 8 consecutive ones sets the data valid signal true. It remains true for 24,576 clock pulses. After going low the next occurrence of 8 consecutive ones sets it high again for another 24,576 clock periods. The relation between the clock, image preparation, data valid, end of image and image data is shown in FIG. 6B. The control signals generated include line reset signal, second page abort, buffer reset, write first image and write second image.

The line reset signal goes high at the end of every 32nd frame. Each frame comprises one line of image data from one or two sub-images and the module 65 includes a counter to count the selected number of frames before providing each line reset signal. Obviously, the number of frames between line reset signals can be varied, although a preferred range is 20 to 40 frames at a thousand lines per inch resolution. The signal remains high during the status word and thereafter drops. The second page abort signal is issued on receipt of a signal representing buffer approaching overflow condition from the main buffer 54. It goes high during the period between the two images and low at the status word. The buffer reset signal is issued every time synchronization is recovered. The write first image signal, coupled to the main buffer memory 54, goes high 128 bits into the second image and low just before the first data image. The write second image goes high 8 bits into the first image and low just before the second image (see FIG. 9B).

Further description of the circuits used in the reader interface 51 is not believed necessary and, those of ordinary skill in the art will be able to adapt appropriate circuits to perform the foregoing functions.

Figure 7B:
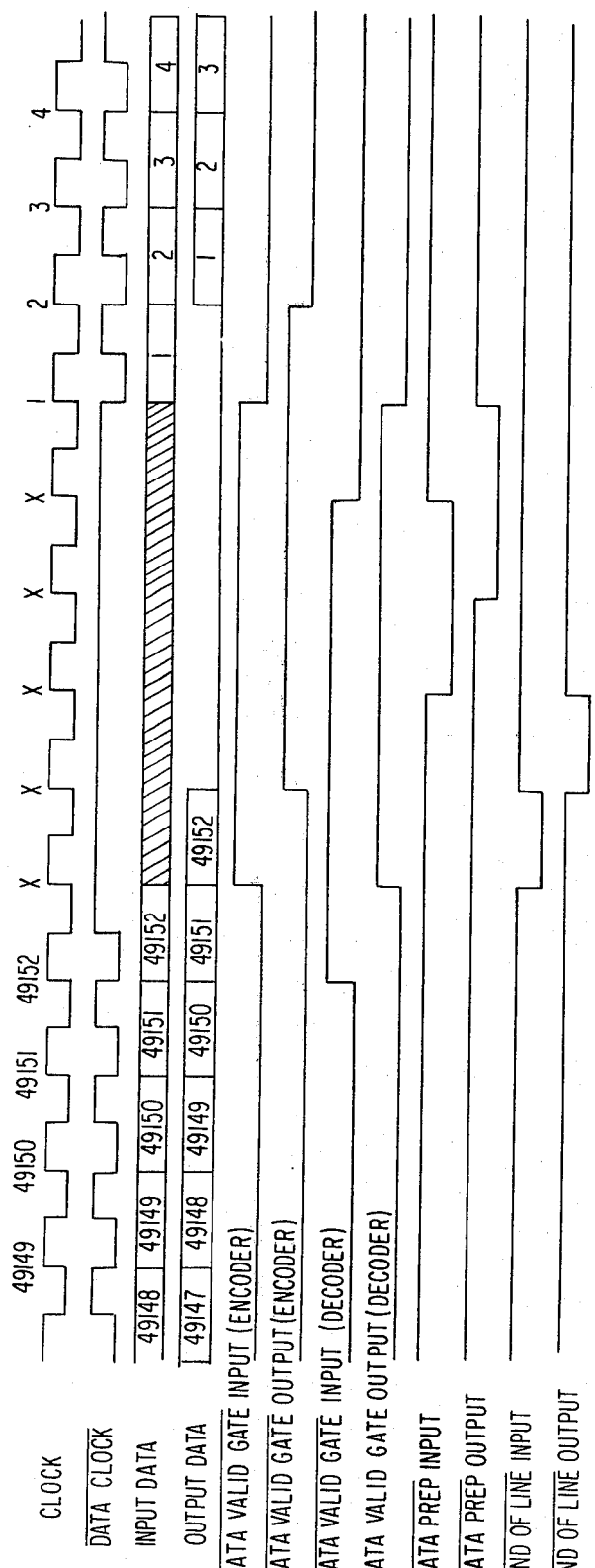
FIGS. 7B and 7C illustrate representative waveforms of FIG. 7A.
Figure 7C:
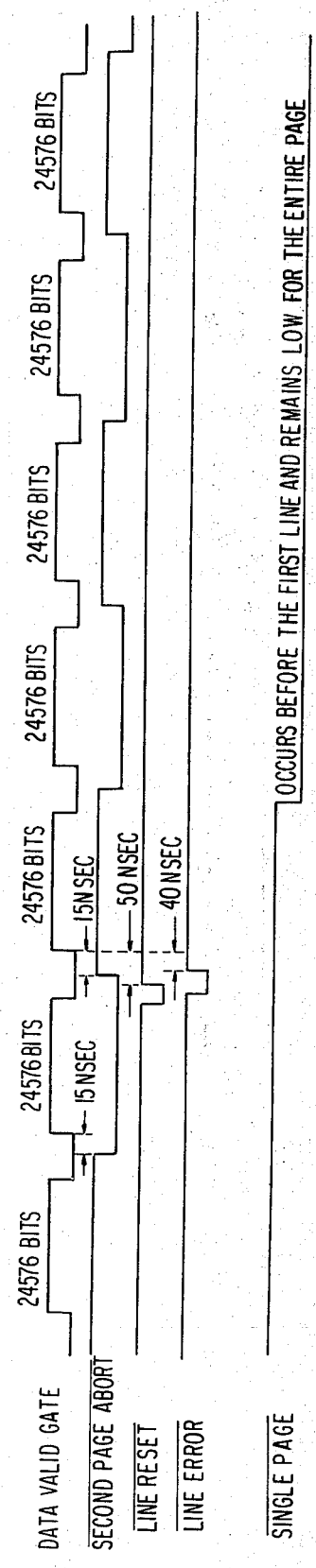

Turning now to the line buffer 52, a detailed block diagram of that module is shown in FIG. 7A, and associated timing diagrams are shown in FIGS. 7B and 7C. The data input to this unit (image data) provides one input of AND gate 700, the output of which provides the input to a flip-flop 703, and the output of flip-flop 703 is a signal current line, which is passed onto the encoder predictor 53. In addition, the line buffer 52 produces 1st previous line and 2nd previous line data. The line buffer 52 is subjected to clocking signals as well as certain control signals. Some of these control signals, i.e., data valid gate, image preparation and end of line are passed along to the encoder predictor 53, after being reclocked, along with the data clock.

As shown in FIG. 7A the image data is also input to a four stage shift register 706 which, after a three bit delay allows the data to be loaded, in parallel, into a latch 707. Three random access memories (RAM) 708 each take one data bit from the latch 707. The RAMs receive a write and read signal every three clock pulses so that the contents of the latch 707 is written before the RAM 708 is loaded. The three RAMs are addressed at the same time by a modulo 16,381 counter 733 via a multiplexer 734. The counter 733 is clocked by a divide by 3 circuit 731 which divides the data clock. Because the RAMs are operating at $\frac{1}{3}$ the data rate, they provide a 16,381×3 or 49,143 bit delay. Thus, the output of the RAMs is delayed 49,147 bits (3 additional bit times for the shift register 706 plus another for latch 707) with respect to the undelayed data. The three output lines of the RAMs 708 are loaded into a latch 709, the contents of which is transferred, in parallel to a shift register 710 which is read out serially. The latch 709 adds one additional bit time while shift register 710 adds 3 more for a delay of 49,151 bits. The output of the shift register 710 is provided to an adjustable delay 711, and the output of the delay 711 is one input to an AND gate 701. The adjustable delay 711 is an adjustable shift register, which is nominally selected to provide a 1 bit delay for a total of 49,152 bits between input to shift register 706 and gate 701. The output of the delay 711 are ANDED with second page abort, data valid and line reset in gate 701. If a second page abort occurred the line buffer will receive the second page abort signal and cause the data outputs to go low during the second page of data. The data valid signal is received from the interface 52 when the line buffer is receiving valid data, when data valid occurs data is present at the output of the buffer 52. When a line reset signal is received a delayed data output is held low to simulate clearing of the delay units. The output of gate 701 is 1st previous line image data.

The buffer 52 can transmit one or two pages at a time by storing either one or two lines of data from one or two images. In the case of a single image being transmitted, i.e., a single page, the address counters 733 address 8,192 fewer locations of RAM causing the delay of the output to be 24 K bits rather than 48 K bits. This is controlled by the presence of the single page signal which is another input to counter 733.

The 2nd previous line is obtained by using the output of AND gate 701 as an input to an identical chain consisting of shift register 716, latch 717, RAMs 718, latch 719, shift register 720 and shift register 721. This input is provided through the multiplexer 722 which normally couples the output of gate 701 to the register 716.

Because the RAMs employed are static, refresh is required. To this end, a second divider 737 responds to the data clock rate and the output is used to clock a refresh address counter 739. A different set of address counters is used for refresh purposes so that the data address counters 733 will start at the correct address whenever valid data is received. Refresh occurs only when the data valid signal indicates no valid data is being received by the line buffer. Thus, multiplexer 734, in the presence of a signal from the memory control timing 732 passes the output of the counter 733 to address the RAMs 708 and 718. On the other hand, in the absence of a signal from the memory control timing 732, the output of counter 739, i.e., the refresh counters is coupled by the multiplexer 734 to address the RAMs 708 and 718. The internal connection of RAMs of output to input, for refresh purposes is not illustrated.

Accordingly, the output of the line buffer 52 provides a data clock, current line image data, 1st previous line image data, and 2nd previous line image data to the encoder predictor 53. Since the line buffer 52 is essentially similar to the line buffer employed in the decoder, FIG. 7A illustrates both with the exception that, line buffer 52 in the encoder does not have the signal line error. As illustrated in FIG. 7B the output data (current line) is delayed one bit time relative to the input image data. The 1st and 2nd previous line outputs are not illustrated, but are precisely controlled by the buffer, in time relation to the current line data. Each of the 1st and 2nd previous lines are delayed 49,152 bit times with respect to the adjacent output line.

The encoder/predictor 53 is illustrated in more detail in FIGS. 8A through 8D, and FIGS. 8E and 8F illustrate associated timing relationships.

Figure 8A:
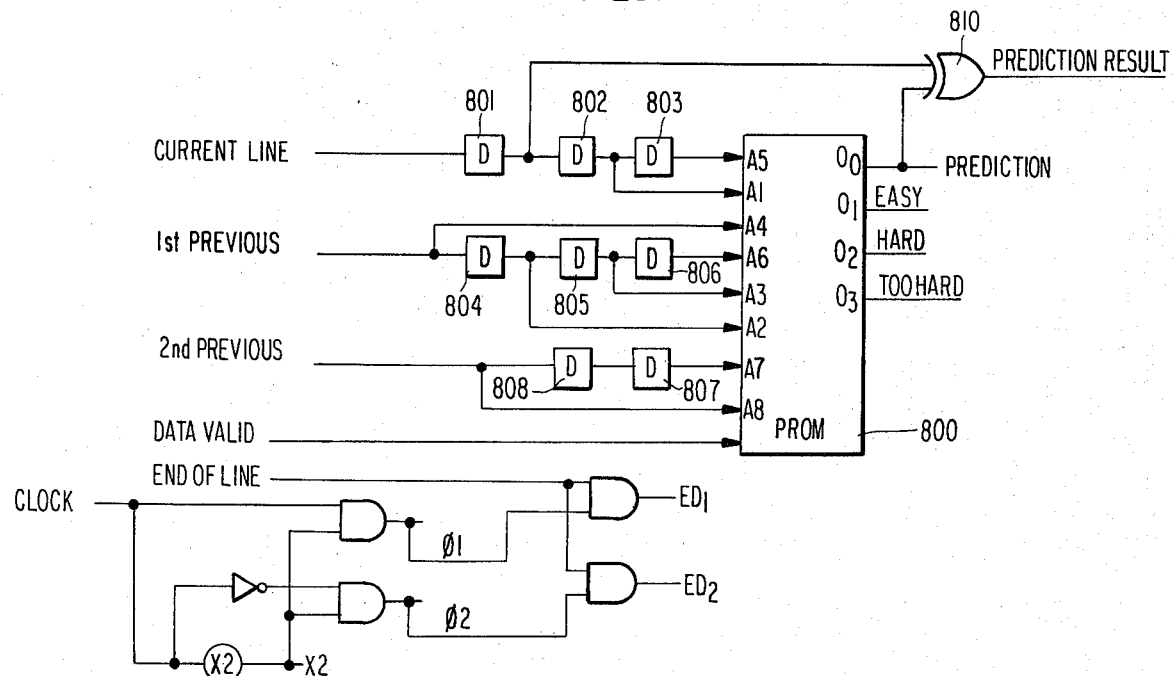
FIGS. 8A, 8B, 8C and 8D are detailed block diagrams of predictor 53 of FIG. 5.

Referring firstly to FIG. 8A, a PROM 800 is illustrated which employs 8 inputs (terminals $A_1$–$A_8$) and produces 4 outputs, the first output $O_0$ is the prediction, and the other three outputs $O_1$ through $O_3$ are controls indicating whether or not the prediction is easy, hard or too hard. The information in the PROM 800 is prerecorded based on a statistical sample of the types of images to be transmitted. FIG. 8A is arranged to operate with the prediction pattern shown in FIG. 4D and the addressing inputs $A_1$–$A_8$ correspond to the pixels $X_1$ through $X_8$ which are employed to predict the condition of the pixel $X_0$.

The addressing inputs to the PROM 800 are derived from the current line, 1st previous line and 2d previous line inputs which, in turn, are derived from the outputs of line buffer 52. Coupled between these outputs and the addressing inputs to the PROM 800 are delay circuits 801 through 808, each providing a one bit delay. Those skilled in the art will recognize that these delay circuits could be implemented with single stage flip-flops, but of course, other devices could also be used. At any instant in time we can define the output of delay 801 as the pixel $X_0$ (see FIG. 4D). Accordingly, the output of delay 802 corresponds to pixel $X_1$, which provides an addressing input to the PROM 800 at terminal $A_1$. Likewise, the output of delay 803 corresponds to pixel $X_5$ and this unit provides input on the addressing terminal $A_5$.

The 1st previous line input at terminal $A_4$ is one bit time "ahead" of the pixel $X_0$ and therefore corresponds to pixel $X_4$. The output of delay 804 corresponds to $X_2$, the output of delay 805 corresponds to $X_3$, the output of delay 806 corresponds to $X_6$. With respect to the 2d previous line, terminal $A_8$ has a signal representing pixel $X_8$ and the output of delay unit 807 coupled to address input $A_7$ corresponds to the status of pixel $X_7$.

Accordingly, the inputs $A_1$ through $A_8$ are subjected to signals representing pixels $X_1$ through $X_8$. Based on the statistical analysis of the types of images to be transmitted, and the corresponding data stored in the PROM 800, when gated by data valid, PROM 800 produces at an output $O_0$, a predicted value of the pixel $X_0$, this output provides one input to exclusive OR gate 810, the other of which is provided with the actual condition of the pixel $X_0$. Thus, the output of exclusive OR gate 810 is in one condition or another depending upon whether or not the prediction is correct or incorrect.

Figure 8B:
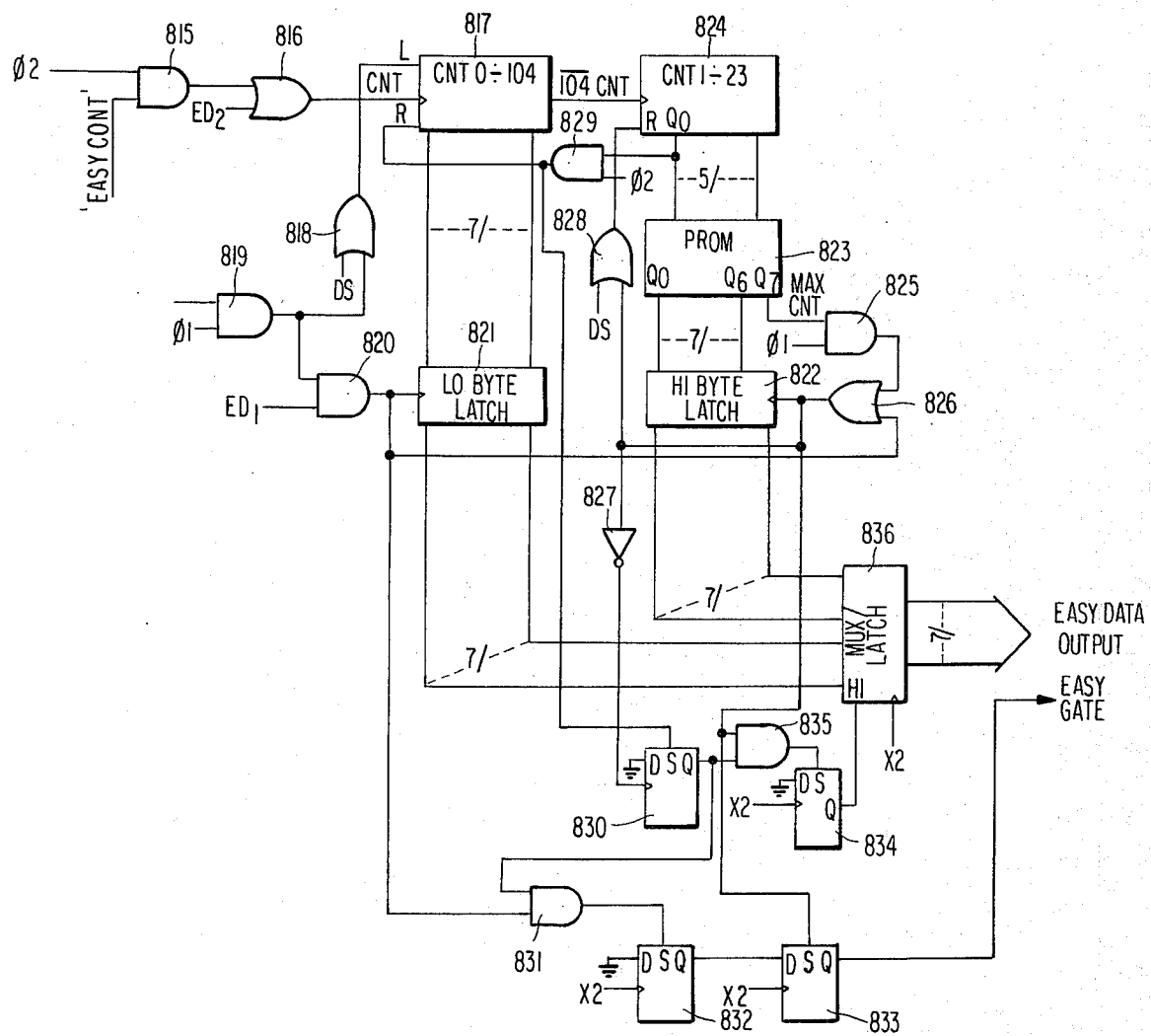
Figure 8C:
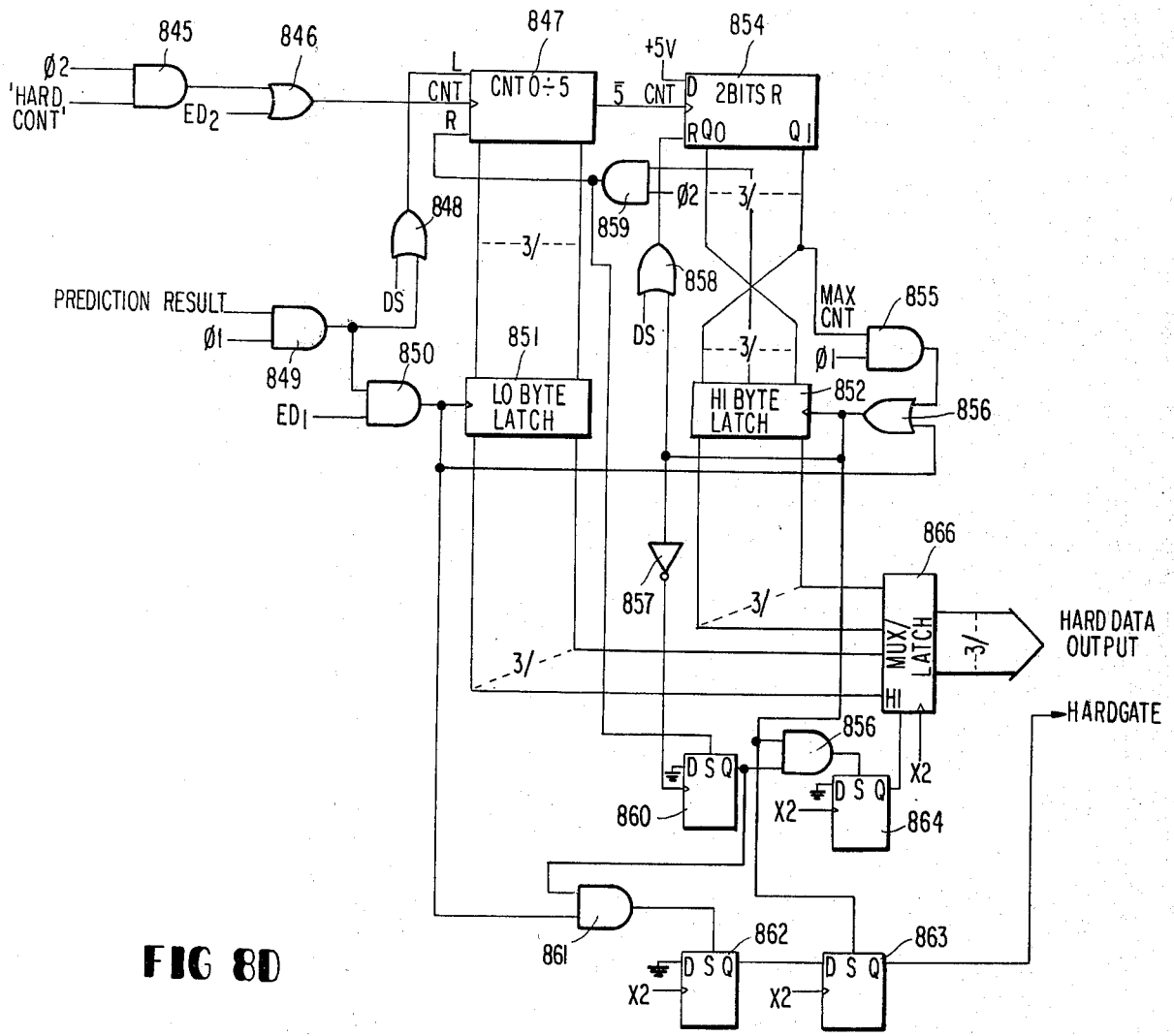
Figure 8D:
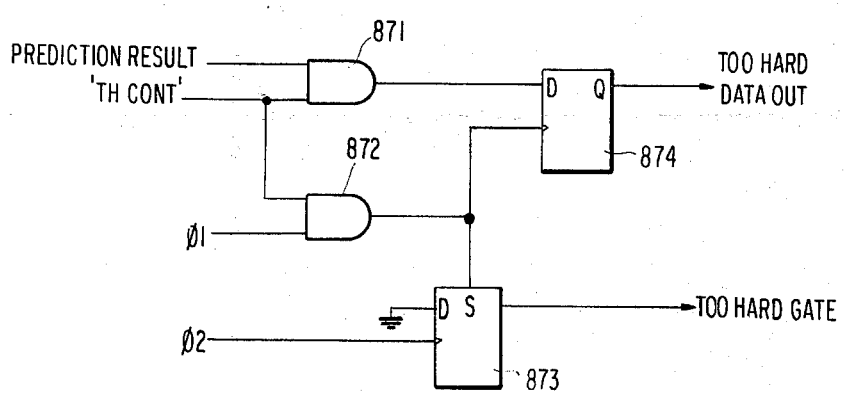

The four outputs of the PROM 800 and the output of exclusive OR gate 810, along with the timing signals developed by the other circuit illustrated in FIG. 8A, are coupled to two run length encoders, shown respectively in FIGS. 8B and 8C, for the case of the easy and hard predictions, and finally to a retiming circuit shown in FIG. 8D, for the too hard predictions.

FIG. 8B illustrates the encoder for the easy predictions. At its output the encoder provides, in time sequence a series of seven bit code words, each associated with a gate signal. The code word is indicative of the number of correct predictions between incorrect predictions of the easy category, and the gate signal is employed to write each code word, as produced into a high speed buffer associated with the easy class of code words.

The run length encoder of FIG. 8B is arranged to encode data in a Bradley 7,105 code. Each of the encoded words are 7 bits long and can encode run lengths of up to 105 pixels as a single word (bit combinations 0000000 corresponds to a run of one to 1101000 for a run length of 105). Runs longer than 105 pixels are encoded as two words, one word representing a number (up to 23) of 105 pixel runs and another word representing the remaining number of pixels in the run (up to 105). Therefore, a run of 2415 pixels is represented as 1111111.

As shown in FIG. 8B the prediction result is one input to AND gate 819, the other input of which is the timing signal $\phi 1$. The output of AND gate 819 is coupled to OR gate 818, the output of which is a load signal for a counter 817 counting modulo 104 which, when loaded, is loaded as 1111111. The clocking input of the counter is derived from the easy control output of PROM 800, through AND gate 815 (where it is ANDED with the timing signal $\phi 2$) and through OR gate 816. Thus, for each correct easy prediction the counter 817 is incremented. Each time counter 817 overflows, a modulo 23 counter 824 is clocked (and counter 817 is reset via AND gate 829). The output of counter 817 is an input of latch 821, and the output of counter 824 is an input to PROM 823. PROM 823 translates the five bit output of counter 824 to seven bit form required for proper encoding. The occurrence of an easy prediction error, produces the following results. The error signal is an input to gate 819 which, at $\phi 1$ time produces an output, through OR gate 820, to clock latch 821 so as to latch in the status of counter 817. The same output of gate 819 results in loading of counter 817. The output of OR gate 820 (which is one input to OR gate 826) produces a clocking input to latch 822, which therefore latches the output of PROM 823. The error signal also operates flip-flop 832 (through an AND gate 831 if flip-flop 830 had previously been set when counter 824 was first incremented) and flip-flop 833 (from OR gate 826). Flip-flop 833 provides a gate signal to module 54 to read in an encoded word. If counter 824 was not incremented, then multiplexer 836 passes only the low byte from latch 821. However, if counter 824 was incremented, flip-flop 830 had been set. Accordingly, when the error signal is produced, flip-flop 834 is set through AND gate 835. This forces multiplexer 836 to first pass the high byte from latch 822. When flip-flop is reset, multiplexer 836 can pass the low byte from latch 21. A second gate is produced since, flip-flop 832 sets flip-flop 833 for the second gate.

FIG. 8C illustrates the run length encoder for hard predictions. This is entirely similar to the encoder of FIG. 8B with several exceptions. The encoder of FIG. 8C is a Bradley 3,6 encoder. Each of the encoded words is 3 bits long and can encode run lengths of up to 6 pixels as a single word (bit combination 000 corresponds to runs of one to 101 for run lengths of 6). Runs longer than 6 pixels are encoded as two words, one word representing a number (up to 2) of 6 pixel runs, another word representing the remaining number of pixels in the run. Therefore, a run of 12 pixels is represented as 111. Thus, the Modulo 104 counter 817 is replaced by a modulo 5 counter 847. In addition the modulo 23 counter 824 is replaced by a two shift register 854 and the PROM 823 is replaced by reconnecting the bit order from output of shift register 854 to latch 852. The third bit of the 3 bit byte input to latch 854 is wired to the low order shift register output, which is always high whenever counter 857 overflows; at other times the shift register output is not meaningful. In other respects, the encoder of FIG. 8C is identical to that of FIG. 8B so no further discussion is required.

As shown in FIG. 8D AND gate 871 has one input from the too hard control signal and the corresponding prediction result. When a too hard prediction is addressed the associated control signal is generated by PROM 800. As a result, AND gate 872 produces an output to set flip-flop 873 and to clock flip-flop 74. Flip-flop 873 produces the associated gating signal and the result of ANDing (in gate 871) of the control signal and the prediction result is applied to flip-flop 874. Thus the output of flip-flop 874 is PREDICTION RESULT. For the too hard predictions, PROM 88 can store, as the prediction bit a "0". Since PREDICTION RESULT = PREDICTION $\oplus$ DATA, if the prediction is always 0, the prediction result will always be the corresponding image data and output of flip-flop 874 will be data. On the other hand, the PROM 800 can store a prediction bit "1" for each too hard prediction. The corresponding output of flip-flop 874 will be data rather than $\overline{data}$. As a further alternative, the PROM 800 can store the actual prediction. In this case the signal prediction result will be an indication of whether the prediction is correct or incorrect. This itself can be transmitted (or the inverse) rather than image data. In all three cases the circuit of FIG. 8D serves to transmit unencoded image data. In the first two cases either data or its inverse is transmitted, in the latter case, a representation of the data, from which the data can be obtained with a similar predictor, on a one-to-one basis. This is in contrast to the encoders of FIGS. 8B and 8C which produce data compression by run length encoding of the prediction results. Input and output timing is shown in FIGS. 8E and 8F.

Accordingly, each of the run length encoders, responds to the control outputs of the PROM 800 and the prediction results output of the exclusive OR gate 810 and for each incorrect prediction generates a code word identifying the number of correct pixels between two incorrect predictions of the same class. Each code word is then passed on to the associated high speed buffer. In contrast, for reasons already explained, the predictions in the "too hard" class are not run length encoded, rather the raw information is coupled on to the associated high speed buffer. As discussed, the unencoded information can be in a number of forms, i.e., it can correspond to the pixel condition, it can correspond to a correct/incorrect prediction or it can be the inverse of either, so long as the decoder and encoder are configured for the same data format.

Figure 9A:
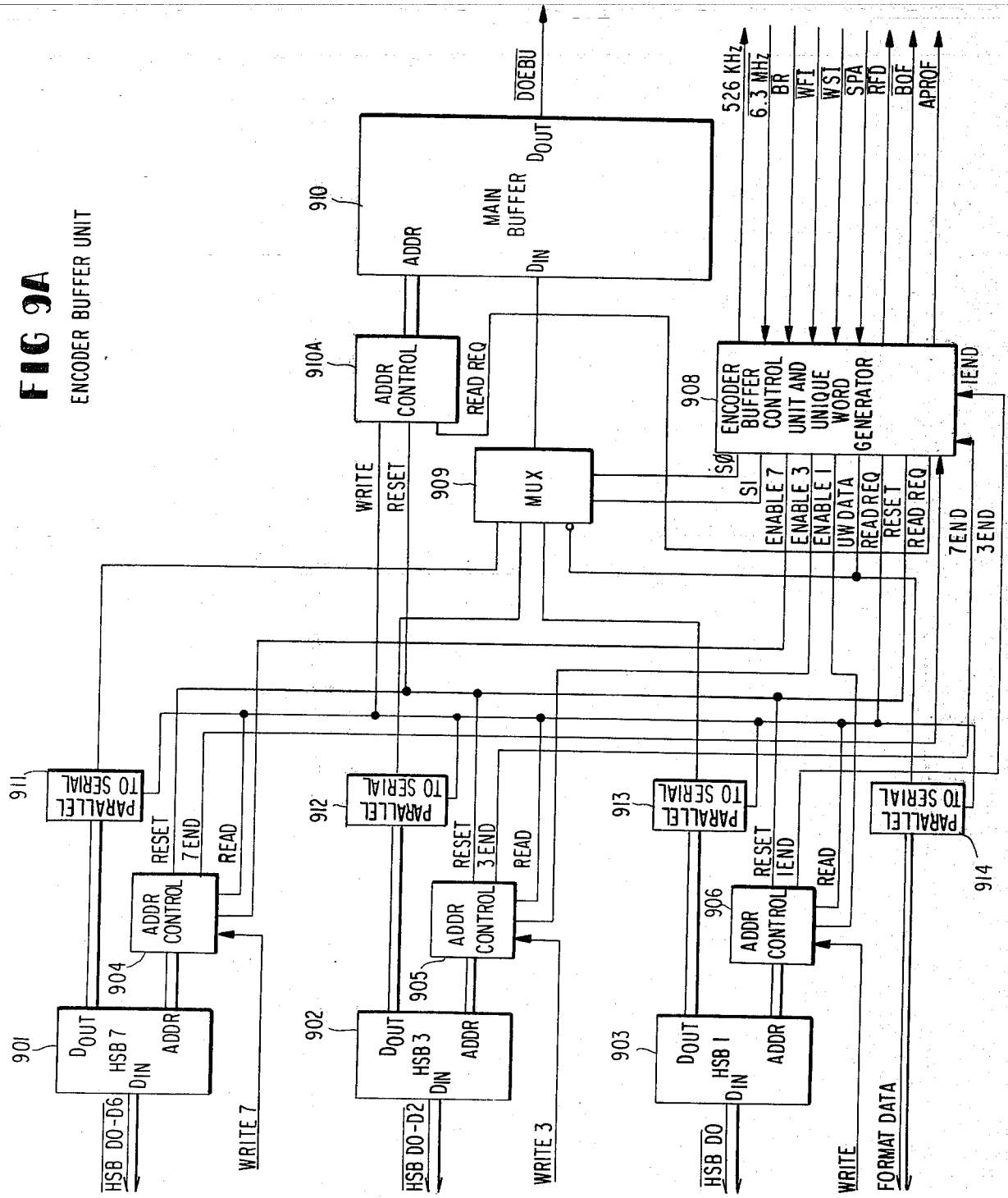
FIG. 9A is a detailed block diagram of the high speed and main buffer 54 of FIG. 5.
Figure 9D:
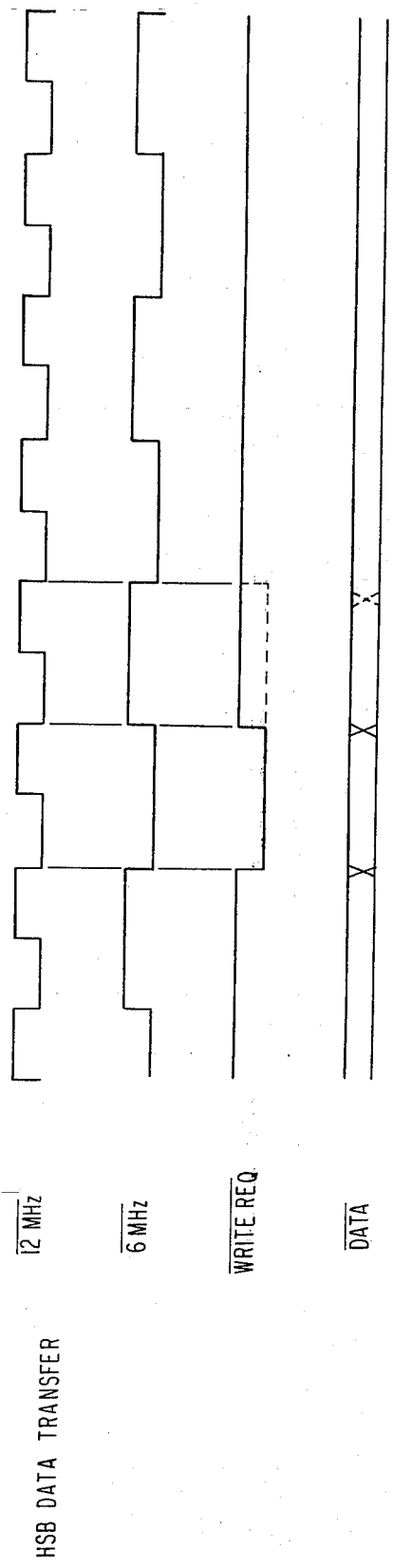
Figure 9E:
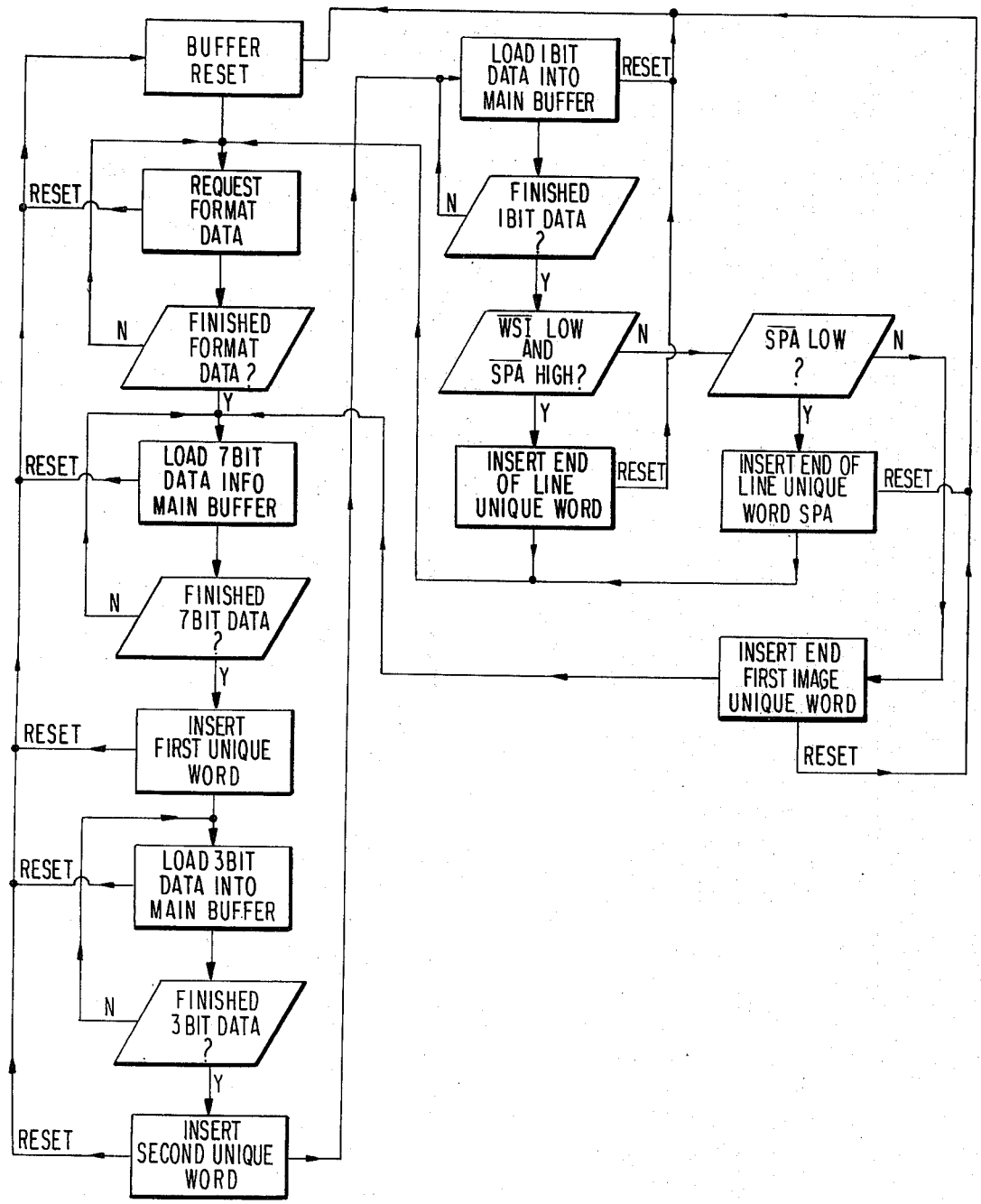
FIG. 9E represents a flow diagram of the operation of control unit 908 of FIG. 9A.

The high speed and main buffer 54 is illustrated in block diagram fashion in FIG. 9A, and the associated timing diagrams 9B through 9D; operation of the encoder buffer control unit and unique word generator 908 is illustrated in FIG. 9E.

Referring first to FIG. 9B, the first line illustrates in time sequence the input to the encoder interface 51, i.e., the status word, first sync word associated with the first image data, second sync word associated with the second image data and so on.

As the interface 51 passes along the first image data, through the line buffer 52 and the encoder predictor 53, the prediction results produce a plurality of run length encoded words, and unencoded words corresponding to pixels in the "too hard" class. At the conclusion of the first image data, the predictor encoder 53 has completed its encoding operation, and synchronous with the termination of the second sync word (associated with the second image data), the signal format data ready, coupled from the interface 51 unit to the high speed and main buffer 54 initiates a transfer of format data to the high speed and main buffer 54. At the conclusion of that operation the signal write first image goes low and the high speed buffers 901–903 (FIG. 9A) are read out, and data corresponding to the first image is assembled in the main buffer 910, as will be explained. Thus, as shown in FIG. 9B, the main buffer receives format data responsive to the signal format data ready (timing is shown in detail in FIG. 9C) and in response to the signal write first image, first 7 bit data words (corresponding to the easy prediction class) and then 3 bit data words (corresponding to the hard prediction class) and then 1 bit data words (corresponding to the "too hard" prediction class) are written into the main buffer 910.

The encoding apparatus handles second image data in the same fashion except that, the information from the high speed buffers 901–903 corresponding to the second image data is transferred to the main buffer 910 when the signal write second image goes low, as shown in FIG. 9B. Accordingly, each frame of incoming data (a single status word, a first image data and second image data) generates, in the main buffer, signals corresponding to format data, a plurality of 7 bit run length encoded data words, a plurality of 3 bit run length encoded data words, and a plurality of 1 bit data words each separated by unique words, and all relating to the first image data. This is followed in the main buffer with another series of 7 bit data words, 3 bit data words and 1 bit data words, corresponding to the second image.

Reference is now made to FIG. 9A which illustrates a 7 bit high speed buffer 901 (that is 7 bits in width) a 3 bit high speed buffer 902 and a 1 bit high speed buffer 903. Associated with the buffers 901–903 are address control circuits 904–906. Each of the address control circuits 904–906 responds to a write signal coupled from either the associated run length encoder or from the gate generating the control signals associated with the "too hard" data. In response to a write signal, the associated data word is written into the buffer at the indicated address, and the address is incremented so that the next word can be written therein. A multiplexer 909 funnels information from a variety of sources into the main buffer 910, in response to control signals coupled thereto from the encoder buffer control unit and unique word generator 908. Inputs to the multiplexer 909 are provided by 4 parallel to serial converters, a first converter 911 coupled to the output of high speed buffer 901, a second parallel to serial converter 912 coupled to the output of high speed buffer 902, a third parallel to serial converter 913 coupled to the output of high speed buffer 903 and a fourth parallel to serial converter 914 coupled to the format data output of the reader interface 51.

Referring again to FIGS. 9B, 9C and FIG. 5, when the interface 51 generates format data ready (FDR) the encoder buffer control 908 responds with a series of requests for format data (RFD), one for each format data word (of which there are seven), and the format data is transferred one word at a time over the format data bus to converter 914. The data is provided, in serial form, through multiplexer 909 to buffer 910 and written in order of receipt.

Immediately following the seventh format data word transfer, control 908 enables buffer 901 via address control 904 and parallel to serial converter 911, and the effective input to multiplexer 909 is altered. Accordingly, those seven bit run length encoded data words relating to the first image are transferred from buffer 901 to buffer 910. Timing of a typical transfer is shown in FIG. 9D.

Since at the time of this transfer, the second image is being encoded, (see FIG. 9B) there is a need to limit the transfer to first image data. To effect this the address controls (904 as well as 905–906) include a latch, which latches the current address of its associated address counter when data for an image is complete. The buffer (901–903) transfers data in response to a received request, when enabled, until the latched address is reached, and then terminates. At the conclusion of data transfer from buffer 901, the control unit 908 supplies the first unique word through multiplexer 909 and buffer 910, and then enables buffer 902. A similar process ensues, at the completion of which, a second unique word is supplied through multiplexer 909 to buffer 910. Finally, buffer 903 is enabled when transfer is complete. The control unit supplies a further unique word, indicating end of first image, with or without an indication of a second page abort. The signals input to the control unit 908 include the clock (6.3 MHz), format data ready (FDR) write first image (WFI) write second image (WSI) second page abort (SPA), all form reader interface 51. The same unit produces S$\phi$, S1 (to control multiplexer 909), enable 7,3,1 (to enable one of the buffers 901–903), unique word data (input to multiplexer 909) reset (to reset address controls 904–906), read request (to enable parallel to serial converters 911–914 and to enable correspondingly, writing to buffer 910 through control 910A) and finally a read request to enable reading from buffer 910 via control 910A.

After the first image data is written into the buffer 910, the signal WFI goes high, and WSI can go low (see FIG. 9B) allowing second image data to be written. Buffer 910 is a FIFO buffer, so data is read out, with the 526 KHz clock, in the order in which it is written.

The control unit 908 monitors the state of buffer 910 and when it contains data exceeding a fixed percentage (about 90%) of its capacity the signal approaching overflow (APROF), to interface 51, is lowered. At interface 51 this produces SPA which aborts second page data encoding, to prevent buffer overflow.

Operation of control 908 is shown, in flow diagram fashion in FIG. 9E.

Data output from buffer 910 is the encoder output, and, as shown in FIG. 1 can be input to a modulator 40 for transmission. Alternatively, it can be stored in conventional mass storage device for later readout. This data has the property of reproducing the original input data, with the aid of an appropriate decoder, without loss of information, although it has been compressed by >10:1.

THE DECODER

Figure 10:
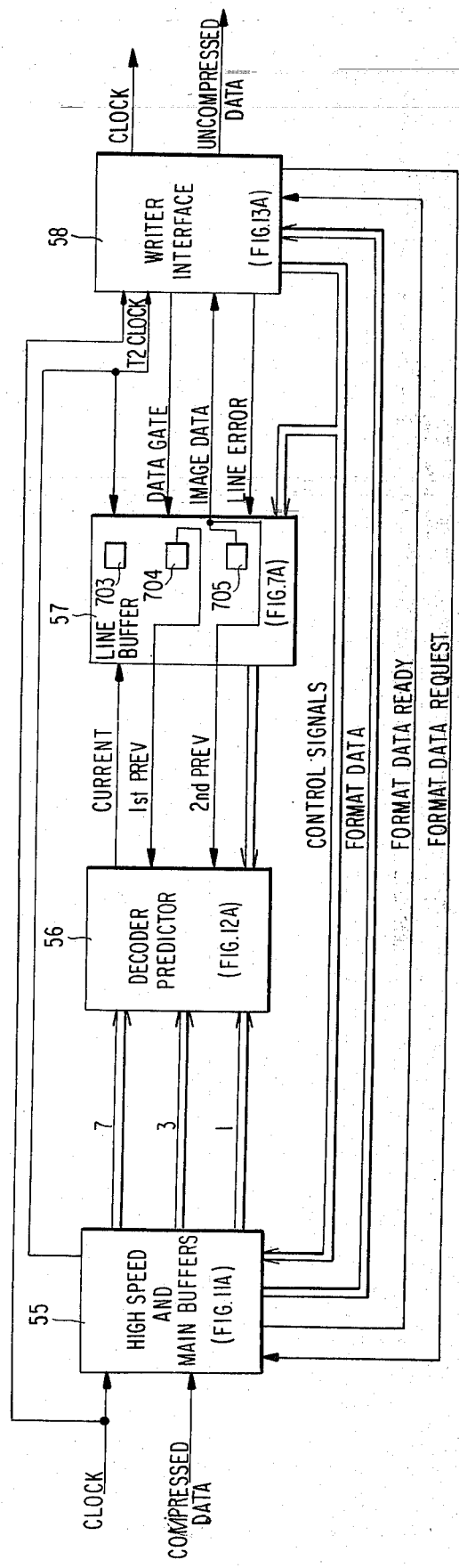
FIG. 10 is a block diagram of a decoder in accordance with the invention.

FIG. 10 is a block diagram of the facsimile decoder, which responds to a compressed data input, compressed as provided for in the encoder (FIG. 5) and produces, at its output, data in uncompressed form, i.e., corresponding to the data input to the reader interface 51. As shown in FIG. 10 the decoder includes, in a serial arrangement, a high speed and main buffers 55, a decoder predictor 56, a line buffer 57 and a writer interface 58.

The high speed and main buffers 55 perform the following functions, it buffers the incoming data in appropriately sized buffers, for example, a 32 k bit first in, first-out (FIFO) buffer, it detects and deletes fill unique words, it detects and deletes other unique words and uses them to control demultiplexing the data between a main buffer and a plurality of high speed buffers, each associated with easy, hard and too hard predictions, reads from the various high speed buffers as requested by the decoder predictor 56 and generates the appropriate control and clocking signals to read data from the appropriate high speed buffers, as required.

The decoder/predictor operates with run length and uncompressed data from the high speed buffers and previous line data from the line buffer to uncompress image data and deliver it to the line buffer.

The line buffers 57, buffer two lines of data and delivers current image data serial stream, provides the apparent clearing of both buffers on a reset command and upon detection of an erroneous line count, provides for the repetition of the last correct line until a reset occurs.

Finally, the writer interface 58 reformats the data employing format signals provided by the high speed and main buffers 55, counts the number of pixels per line to determine whether or not an error has occurred, and if an error has occurred provide the appropriate signal to the line buffers, generate appropriate clocking and control signals and whatever encoding is required by the writer.

FIG. 11A is a block diagram of the high speed and main buffers 55. As illustrated in FIG. 11A compressed data is provided at an input terminal of the decoder main buffer 1100. This buffer is configured as a first-in, first out random access memory, and it provides a data output path to a unique word detector and remover 1101. The unique word detector and remover 1101 first detects the unique words, provides appropriate control signals to a decoder buffer control unit 1109 in dependence upon the particular unique word detected, removes each unique word and provides a serial to parallel conversion, the output of the unique word detector and remover 1101 is 8 bits wide. Address control for the decoder main buffer 1100 is provided by the address control 1102. The address control 1102 provides a write main buffer request to decoder buffer control unit 1109 at each falling edge of the compressed data rate clock (526 KHz) The address control 1102 accepts a read request from the control unit 1109 which is interpreted, at a plurality of high speed buffer address control 1106 through 1108, as a write request. A write request at the appropriate address control unit 1106–1108 is operative to enable writing in the associated high speed buffer 1103–1105, in the presence of an associated enabling signal from the decoder buffer control unit 1109. These various enable signals are produced in response to detection of the appropriate preceding unique word at the unique word detector and remover 1101.

In addition to the encoder main buffer 1100, the high speed and main buffer unit 55 includes three high speed buffers, 1103 through 1105. High speed buffer 1103 has written into it the 7 bit run length encoded data words corresponding to predictions falling in the "easy" class. High speed buffer 1104 has written into it 3 bit data words corresponding to predictions in the "hard" class and high speed buffer 1105 has written into it 1 bit words corresponding to the unencoded data, i.e., those predictions falling in the "too hard" class.

Figure 11E:
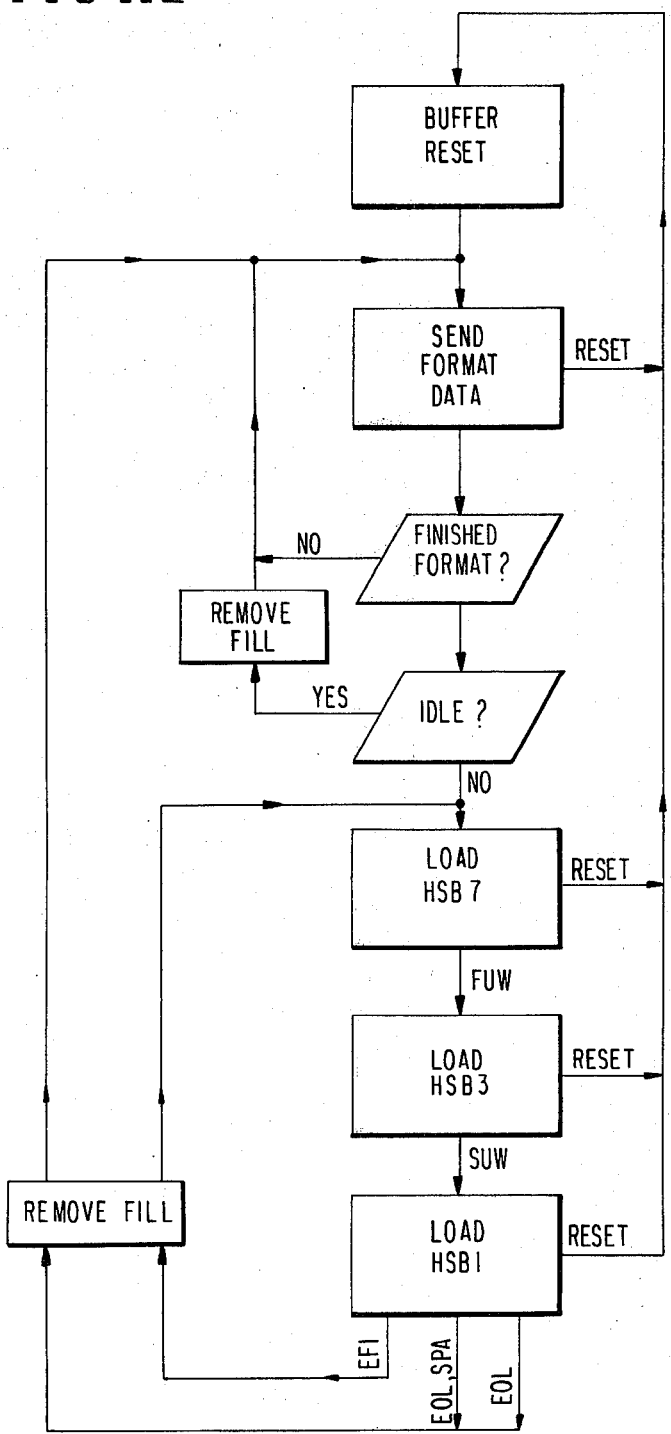
FIG. 11E represents a flow diagram of the operation of control unit 1109 of FIG. 11A.

When the main buffer is full, that is when data consisting of lines from each sub-image, or only the first if the second page was aborted, of compressed data is written, decoder buffer 1109 transmits a main buffer ready ($\overline{BR}$) and at the same time generates the signal format data ready ($\overline{FDR}$). The main buffer 1100 places the first format data word, corresponding to one byte of the third zero count on the format data bus via detector 1101. When accepted by the writer interface unit 48, the signal request format data (RFD) is raised, and the decoder main buffer 1100 places the next byte of the third zero count on the format data bus. This process continues until all seven words in the format data have been transferred. This data transfer is illustrated in FIG. 11B. Following transfer of a format data, buffer control unit 1109 generates the signal enable 7 to enable the high speed buffer 1103 through its address control 1106. Accordingly, data following the format data is coupled to the output terminal of the decoder buffer through the unique word detector remover 1101 onto the data transfer bus to the input terminal of the high speed buffer 1103. At the conclusion of that transfer, the unique word detector and the remover 1101 detects the first unique word from buffer 1100. This is removed, and a control signal is provided to enable the high speed buffer 1104 (and the control signal enabling high speed buffer 1103 is removed). Accordingly, the data following the first unique word is written into the high speed buffer 1104. When the unique word detector and remover 1101 detects the second unique word from buffer 1100 it is removed and a further control signal is provided to the decoder buffer control unit 1109. This further control signal results in disabling high speed buffer 1104 and enabling high speed buffer 1105. Accordingly, data following the second unique word is written into the high speed buffer 1105. At the conclusion of that data, an end of first image unique word is detected by the unique word detector and remover 1101. This unique word is also removed, and a further control signal is provided to the decoder buffer control unit 1109 which results in disabling the high speed buffer 1105. FIG. 11E illustrates in block diagram fashion the operation of control unit 1109 in generating appropriate control signals to effect the described operation.

At this time, image data corresponding to the first sub-image has been transferred from the main buffer 1100 into the associated high speed buffers 1103–1105. This data transfer, and its timing, are illustrated in FIG. 11C.

As each buffer 1103–1105 is filled the address counter in address control 1106–1108 is incremented to reflect the next available address. When the transfer to a particular buffer is completed, the address is latched and held. Later, as data is read out by the decoder/predictor, address control (1106–1108) monitors the relation between the address being read and the latched address. When they are equal the signal EMPTY goes high. When each of controls 1106–1108 produces an EMPTY signal, control 1109 produces the EMPTY signal.

Data stored in the high speed buffers is transferred on request to the decoder/predictor unit 56. When the decoder/predictor 56 is ready to read the 7 bit run length encoded words from buffer 1103 the appropriate read request goes low as shown in FIG. 11D. The manner in which that transfer is effected is discussed in connection with the decoder/predictor unit 56.

The decoder/predictor 56 is shown in block diagram fashion in FIG. 12A. The decoder/predictor 56 is subjected to input signals from the line buffer 57 representing the current line of data, the first previous line and the second previous line. These three signals are delayed by various bit time delays (from 0 to 3) as shown so as to generate the seven input signals coupled to Prom 1201. Of course, at the beginning of any line, the current line data has yet to be created. The Prom 1201 of the decoder/predictor 56 is identical to the encoder/predictor Prom 800. It is subjected to input signals as shown in FIG. 12A which are used to address the Prom 1201 to select among the plural words stored therein, and to generate two types of outputs, one of three control signals indicating whether or not the prediction is easy, hard or too hard, and a pixel prediction. The decoder/predictor includes a pair of counters 1202 and 1203, associated with easy and hard predictions, respectively. The counter is loaded with a quantity from the associated high speed buffer (counter 1202 is associated with buffer 1103 and counter 1203 is associated with buffer 1104) in response to a request signal, and gates 1204 and 1205 generate the appropriate gating signals in the presence of an empty state of the associated counter in conjunction with a timing signal $\phi^1$. The control signals (easy, hard) are coupled through associated gates 1206 and 1207 to downcount the associated counter. When the counter reaches an empty condition, in addition to generating the appropriate read request, the counter output is also coupled to OR gate 1208 whose output is one input to exclusive OR gate 1209, the other input of which comes from the prediction output of Prom 1201. The output of exclusive OR gate 1209 is the expanded image data and thus the output of gate 1209 forms the current line of image data which is input to the line buffer 57 (see FIG. 10). Each of the counters 1202 and 1203 are set from the associated decoders 1210 and 1211, respectively, which are coupled to the output of the associated high speed buffer. Control signals indicating a prediction in "too hard" category are provided as an input to gates 1213 and 1214. At 1214 they are employed to generate a read signal for the high speed buffer 1105, and in gate 1213 the control signals is AND'ed with data from the high speed buffer 1105, the output of the AND gate 1213 forming the last input to OR gate 1208. Before describing the manner in which predictor/decoder 56 generates pixel data, we describe the line buffer 57.

Line buffer 57 is illustrated, in detailed block diagram fashion in FIG. 7A. As mentioned previously, the line buffer in the decoder is identical to the line buffer in the encoder with the following two exceptions. The signal "line error", shown in FIGS. 7A is present only in the decoder line buffer 57. Generation of this signal will be explained in connection with the write interface 58. However, when the signal is produced, flip-flop 740 controls the multiplexer 722 to allow data from AND gate 702 to flow to shift register 716, rather than allowing data from AND gate 701 to flow to the shift register 716. In other words, the first previous line, which had been found to be an error, (causing generation of the line error signal) is deleted by replacing it with a second previous line through the multiplexer 722.

The only difference between the line buffer 52 and the line buffer 57 is that the adjustable delay 711 is set to delay four bit times and adjustable delay 721 six bit times in the decoder, more than the corresponding delay in the encoder. This is for the reason that the data comes from the predictor delayed by two bit times while the predictor requires non-delayed data from the line buffer. Therefore, a different delay scheme is required in the line buffer 57. Finally, the "image data" to buffer 57 is the output of gate 1209, the output of flip-flop 703 is unused, and the image data input to interface 58 is the output of flip-flop 705. Since operation of line buffer 52 has been explained in detail, a repeat of this description in respect of the decoder is not required. However the operation performed by the decoder/predictor 56 and buffer 57 will now be explained. Assume that the compressed data corresponding to the first sub-image line has to be transferred to the appropriate high speed buffers. As the data valid gate is raised gate 730 outputs clocking signals, and Prom 1201, based on its address inputs develops a prediction and a control signal. Since counters 1202,1203 are cleared, their clocking input results in reading a word from the associated high speed buffer. In the case of a run length encoded word, the word is converted (decoded) by convertor 1210 or 1211 to output a quantity representing the number of correct predictions. Thus, the associated counter (1202 or 1203) is loaded. Each succeeding pixel (either easy or hard) down counts the associated counter by one count and the prediction is passed on, unchanged, through gate 1209, as current image data to the buffer 57. When the counter has been down counted to overflow the counter output has two effects. First, it produces an output from gate 1208 which has the effect of negating the output of gate 1209 with respect to its prediction input. Thus, the incorrect prediction is "corrected" so the current image data is correct. Secondly, by generating a strobe (or data request) to the associated high speed buffer, a process is begun to locate and "correct" the next incorrect prediction. The too hard class operates one bit at a time (unencoded) to generate appropriate "correction" outputs from gate 1208. So long as Proms 800 and 1201 are identical, the output of gate 1209 will be a signal corresponding to the input to Prom 800. For example, if Prom 800 stores "1" for each too hard prediction, then the transmitted bit will be (negated by gate 810, and negated again by flip-flop 874) image data, the output of gate 1213 will be image data, and this will be negated by the "1" prediction input (assuming Prom 1201 also has a "1" as the prediction) to gate 1209, to produce image data. An identical result is achieved if the Proms store "0", although the intermediate signals will be different. If the Prom 800 stores the actual prediction, then the bit transmitted will be the prediction result, which will correct the identical prediction in Prom 1201 if dictated by actual prediction result. In this fashion the decoder predictor expands the run length encoding and corrects erroneous predictions to produce, at gate 1209 a serial stream of image data identical to the image data originally input at the encoder. This data is first checked for errors, and the format data is added to reconstitute the original input for application to the image writer.

The image data output of the line buffer 57, corresponding to the output of AND gate 702, is coupled to the writer interface 58 along with the input clock signal and format data from the high speed and main buffer 55. The writer interface 58 reconstructs the frame format using the format data and the image data. The writer interface 58 also checks for the proper number of bits in each line of data, and if an improper number is detected signals a line error, the results of which have already been explained. In addition, the writer interface 58 generates a line reset signal once in every fixed number of lines which resets the line buffers 57 to correspond with the periodic resetting of the Encoder line buffers 53. This procedure prevents error propagation past the reset signal.

When the main buffer memory issues a format data ready signal, it places the first of the seven format data words on the format data bus, which is input to the data reformater in the writer interface 58. As each format data word is accepted, a format data request is issued by the reformater which enables the next format data word to be placed on the format data bus, and so on until all seven format data words have been transferred. FIG. 11B illustrates the timing of this data transfer. The reformater also issues a data request to line buffer 57. This enables operation of the line buffer and allows the decoder predictor 56 to generate a line of data, and the second previous line, output from gate 702 (see FIG. 7A) is coupled to the reformater and comprises the image data. Line length errors are detected by counting 24,576 bits of data from the line buffer 57. The high speed buffer memory empty and the decoder's empty signals are then checked eight clock periods after the end of the line. If no transmission errors have occurred, both the high speed buffer memory and the decoders should be empty. If either is not, a line error signal is issued.

In addition, the writer interface 58, in response to the format data generates a second to first image idle signal, the second page abort alarm, the buffer over or underflow alarm and a sync pulse. The second page abort alarm latches the second page abort unique word signal and it is maintained until reset at the beginning of a new page. The buffer over or underflow alarm is latched until the buffer reset occurs. The sync pulse is provided during the status word.

What is claimed is:

1. A data compression device for information scanned in two dimension and represented by a serial stream of pixel representations, comprising:

first buffer means for storing at least some of said pixel representations sufficient to represent a portion of said information extending in both said dimensions;

predictor means coupled to said first buffer means for generating, from at least three pixel representations, a predicted pixel representation for a further pixel, said pixels forming a pixel set extending in both said dimensions, selection means responsive to said at least three pixel representations for selecting, or not selecting, said further pixel for compression encoding, comparing means for comparing said predicted representation of a selected pixel with an actual representation of said pixel from said first buffer means, to determine if said prediction is or is not correct, run length encoding means responsive to said comparing means for encoding successive correct predictions and a following incorrect prediction as at least one multibit word, and second buffer means responsive to said run length encoding means and said predictor means for storing said at least one multibit word and at least one unencoded pixel representation corresponding to an unselected pixel.

2. The device of claim 1 wherein said predictor means predicts a pixel representation from only eight prior pixels.

3. The device of claim 1 or 2 in which said predictor means operates on seven pixels to predict a representation of a ninth pixel forming a set of nine pixels extending through at least three parallel pixel lines with at least two pixels in one of said lines separated by a pixel which is not in said set of nine pixels.

4. The device of claim 1 which includes pre-processor means coupled to an input of said first buffer means for deleting pixel runs of length one.

5. The device of claim 1 or 4 in which said predictor means comprises a read only memory addressed by selected outputs of said first buffer means with a data entry for a set of addresses defined by possible outputs of said first buffer means.

6. The device of claim 5 in which said read only memory stores, for each unselected pixel, a fixed binary quantity.

7. The device of claim 5 in which said read only memory stores, for each unselected pixel, a representation of a statistically most likely representation for said further pixel.

8. The device of claim 5 in which said read only memory stores, at each addressed location, data corresponding to one of plural control signals.

9. The device of claim 5 in which said run length encoding means comprises first and second run length encoders, each with a data and control input, said data input at each said first and second encoders coupled to said comparing means and each said control input coupled to a different one of said plural control signals, said first run length encoder capable of higher data compression than said second run length encoder.

10. The device of claim 1 in which said serial stream is comprised of plural lines of pixels, each line consisting of lines from plural images separated by an image marker, and in which said second buffer means includes means to signal an impending overflow, control means responsive to said impending overflow condition to terminate output from said first buffer means at a determined location in said serial stream, corresponding to said image marker.

11. The device of claim 1 which includes control means responsive to said serial data stream to generate format signals, said control means including counting means, counting a predetermined number of pixels for generating a line reset signal, said first buffer means comprising delay means including means responsive to said line reset signal to clear said delay means.

12. The device of claim 1 wherein said first buffer means comprises first and second delay means, with an output of said first delay means coupled to an input of said second delay means, and wherein said second delay means includes means responsive to said line reset signal to clear said second delay means.

13. The device of claim 11 or 12 in which said counting means produces said line reset signal after counting a number of pixels representing a number of lines in the range of 20-40 lines.

14. The device of claim 1 which further includes transmitter means responsive to compressed data from said second buffer means for transmitting said compressed data, receiving means for receiving said compressed data, third buffer means responsive to said receiving means for writing said compressed data and for, on command, reading said compressed data, decoding means coupled to said third buffer means responsive to said compressed data for decoding said compressed data and for, at times, supplying said command to said third buffer means, predictor means and fourth buffer means, said fourth buffer means storing expanded data and providing selected pixels to said predictor means, said predictor means responsive to said decoding means and said fourth buffer means to generate expanded data and coupled to an input of said fourth buffer means, counting means coupled to said fourth buffer means for counting pixel representations in a pixel line, and control means responsive to an erroneous number of pixels in a line for deleting said line and replacing said line with a copy of another line.

15. The apparatus of claim 14 in which said fourth buffer means comprises third and fourth delay means each with an output and input, with an output of said third delay means coupled to an input of said fourth delay means and in which said control means comprises a bistable device, normally in one condition and responsive to a control signal from said counting means counting an excessive number of pixels, for switching to a second condition, and switching means, normally coupling said third delay means output to said fourth delay means input and responsive to said bistable device in said second condition to couple said fourth delay means output to said fourth delay means input.

16. A method of compressing a serial digital data stream representing pixels of an image scanned in two dimensions at a resolution sufficient to negate the importance of single pixel runs comprising the steps of:

eliminating single pixel runs, from said serial data stream, selecting a plurality of pixels from a set of pixels representing an image portion extending in two dimensions from which to predict the condition of a last remaining pixel in said set, predicting, from said plurality of pixels, the condition of said remaining pixel and determining whether or not run length encoding is appropriate for said predicted pixel, comparing said predicted pixel with said actual pixel and run length encoding correct/incorrect predictions, filling a buffer with a sequence of run length codes representing run length encoding of said correct/incorrect predictions and following said codes with one or more signals representing pixels for which run length encoding was determined to be inappropriate.

17. The method of claim 16 in which said selecting step includes selecting a plurality of only eight pixels with which to predict the state of a ninth pixel in a nine pixel set.

18. The method of claim 17 in which said nine pixel set extends over portions of at least three lines and in which at least one said line includes two pixels from said set separated by a pixel not included in said set of nine pixels.

19. The method of claim 16 in which said predicting step includes the steps of:

determining, for each different plurality of eight pixels, the most likely state of a ninth pixel in a set of nine pixels and the entropy of said ninth pixel, comparing said entropy with a first reference and, if said first reference exceeds said entropy, determining that run length encoding is appropriate or otherwise determining that run length encoding is inappropriate.

20. The method of claim 19 in which said predicting step further includes the steps of:

comparing said entropy, if less than said first reference, with a second reference, and determining a first run length encoding or second run length encoding, is appropriate for said pixel if said entropy is less or greater than said second reference, respectively.

21. The method of claim 20 which includes the further step of recording, at a different location, an entry corresponding to each different plurality of pixels, and indication of the most likely state for said remaining pixel, and in which said step of predicting includes reading said recorded entry to determine the most likely condition for said remaining pixel.

22. The method of claim 21 in which said recording step includes recording, along with each entry, an indication of results of said comparisons with said first and second references.

23. A method of transmitting image representing data in compressed form from a transmitter to a receiver comprising the steps of:

raster scanning a field of view in two dimensions and digitizing samples obtained by said scanning to produce a serial stream of digital pixel representations, arranging two independent images in said field aligned so that each line of said raster covers corresponding portions of both said independent images, compression encoding at least some information from said serial stream, to produce a compression encoded stream, transmitting said compression encoded stream to a receiver, compression decoding said compression encoded stream at a receiver, and recreating, at said receiver, at least one of said two independent images.

24. The method of claim 23 which includes the further step of:

buffering said compression encoded stream prior to said transmission, said buffering comprising the steps of:

writing said compression encoded stream into at least two buffers in an order of receipt as dictated by said raster, reading from both said buffers signals representing a first image prior to reading signals from said buffers representing a second image.

25. The method of claim 24 which includes the further steps of:

additionally buffering signals read from said two buffers, in a third buffer, monitoring the contents of said third buffer, and aborting transfer of signals representing said second image in the event said third buffer contents approach capacity of said third buffer.

* * * * *